United States Patent [19]

Kumada

[11] Patent Number: 5,815,642
[45] Date of Patent: Sep. 29, 1998

[54] IMAGE PROCESSING APPARATUS AND METHOD

[75] Inventor: Shuichi Kumada, Yokohama, Japan

[73] Assignee: Canon Kabushiki Kaisha, Tokyo, Japan

[21] Appl. No.: 872,041

[22] Filed: Jun. 10, 1997

Related U.S. Application Data

[63] Continuation of Ser. No. 380,620, Jan. 30, 1995, abandoned.

[30] Foreign Application Priority Data

Jan. 31, 1994 [JP] Japan .................................. 6-009886
Jan. 24, 1995 [JP] Japan .................................. 7-008949

[51] Int. Cl.$^6$ ...................................................... G03F 3/08
[52] U.S. Cl. ..................... 395/109; 358/518; 358/523; 358/524; 358/527; 345/150; 345/431
[58] Field of Search ..................... 358/506, 504, 358/518, 523, 524, 527; 345/150, 153, 431; 348/180, 181, 182; 395/109; G03F 3/08

[56] References Cited

U.S. PATENT DOCUMENTS

| | | | |
|---|---|---|---|
| 4,707,727 | 11/1987 | Penney | 358/520 |
| 5,231,504 | 7/1993 | Magee | 358/500 |
| 5,237,409 | 8/1993 | Yamaguchi | 358/518 |
| 5,243,414 | 9/1993 | Dalrympte et al. | 358/500 |
| 5,309,257 | 5/1994 | Bonino et al. | 358/504 |
| 5,311,295 | 5/1994 | Tallman et al. | 348/180 |
| 5,319,473 | 6/1994 | Harrington | 358/518 |
| 5,416,890 | 5/1995 | Beretta | 395/131 |
| 5,448,379 | 9/1995 | Ishihara et al. | 358/518 |

*Primary Examiner*—Thomas L. Stoll
*Attorney, Agent, or Firm*—Fitzpatrick, Cella, Harper & Scinto

[57] ABSTRACT

An image processing apparatus designates a type of color gamut check method and an output device model for a color gamut check, and sets information indicating a color gamut of the output device model in accordance with a designated type of color gamut check method and a designated output device model. The apparatus then checks, on the basis of the information, whether input color image data is within the color gamut of the designated output device model.

15 Claims, 26 Drawing Sheets

PRINTER PROFILE

FOR COLOR GAMUT CHECK1     FOR COLOR GAMUT CHECK2     FOR COLOR GAMUT CHECKn

MONITOR PROFILE

FOR COLOR GAMUT CHECK1     FOR COLOR GAMUT CHECK2     FOR COLOR GAMUT CHECKn

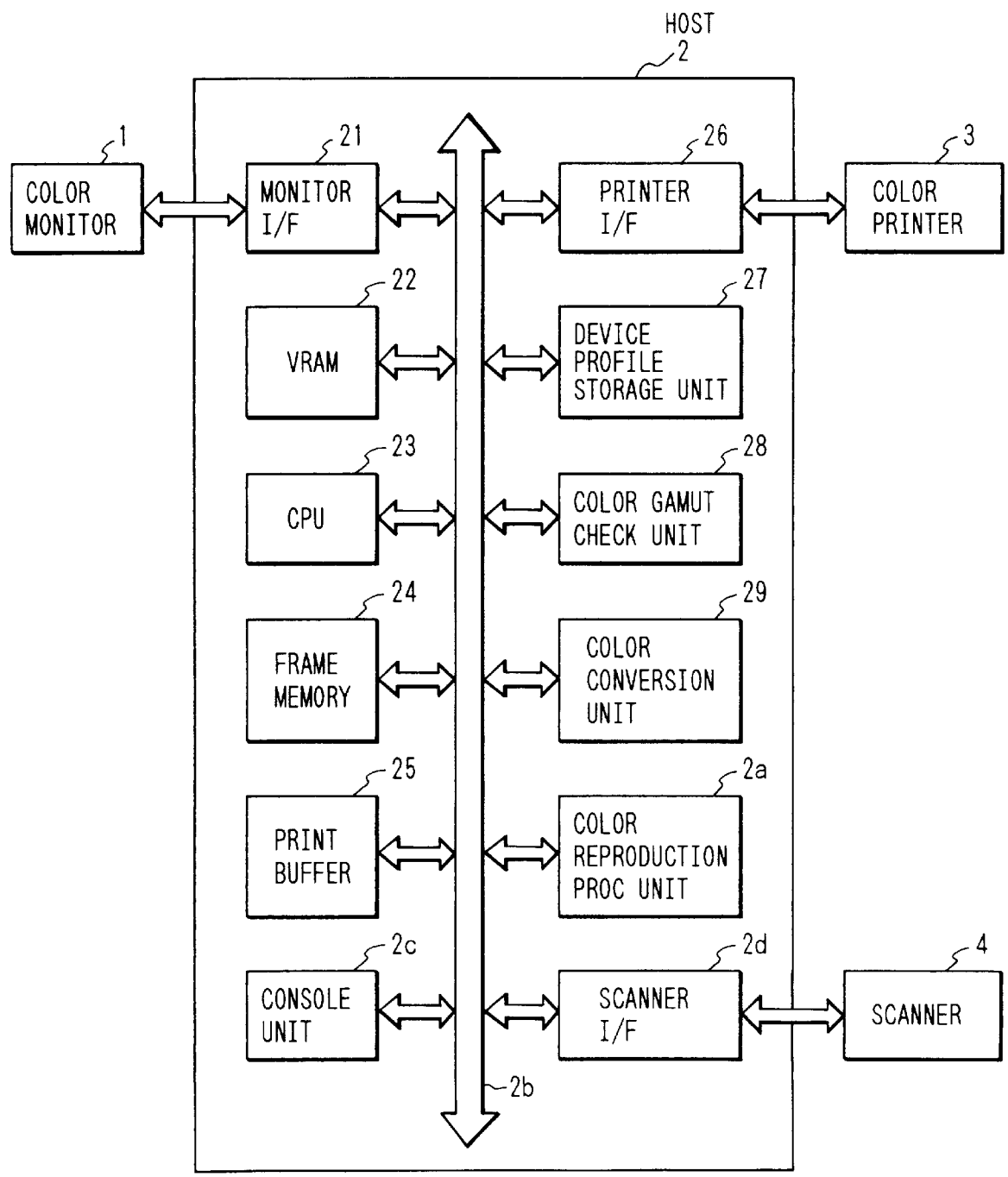

FIG. 5

$$\begin{pmatrix} X \\ Y \\ Z \end{pmatrix} = \begin{pmatrix} P_{11} & P_{12} & P_{13} \\ P_{21} & P_{22} & P_{23} \\ P_{31} & P_{32} & P_{33} \end{pmatrix} \begin{pmatrix} R \\ G \\ B \end{pmatrix}$$

FIG. 6

$$\begin{cases} L^* = \begin{cases} 116(Y/Y_n)^{\frac{1}{3}} - 16 & (Y/Y_n > 0.008856) \\ 903.3(Y/Y_n) & (Y/Y_n < 0.008856) \end{cases} \\ \\ a^* = \begin{cases} 500\left[(X/X_n)^{\frac{1}{3}} - (Y/Y_n)^{\frac{1}{3}}\right] & \begin{matrix} X \\ Y \end{matrix}\begin{pmatrix} X_n > 0.008856 \\ Y_n > 0.008856 \end{pmatrix} \\ 500[f(X/X_n) - f(Y/Y_n)] & \begin{matrix} X \\ Y \end{matrix}\begin{pmatrix} X_n < 0.008856 \\ Y_n < 0.008856 \end{pmatrix} \end{cases} \\ \\ b^* = \begin{cases} 200\left[(Y/Y_n)^{\frac{1}{3}} - (Z/Z_n)^{\frac{1}{3}}\right] & (Z/Z_n > 0.008856) \\ 200[f(Y/Y_n) - f(Z/Z_n)] & (Z/Z_n < 0.008856) \end{cases} \\ \\ \text{WHERE,} \quad f(X/X_n) = 7.787(X/X_n) + 16/116 \\ \qquad\qquad\;\; f(Y/Y_n) = 7.787(Y/Y_n) + 16/116 \\ \qquad\qquad\;\; f(Z/Z_n) = 7.787(Z/Z_n) + 16/116 \end{cases}$$

FIG. 10

| DEVICE MODEL |
|---|
| DATA SIZE |
| VERSION |
| CMM Subtype |
| Gamut checktype |
| OFFSET VALUE FOR CMM PROC INFORMATION STORAGE UNIT |
| OFFSET VALUE FOR INFORMATION STORAGE UNIT FOR DEVICE COLOR GAMUT CHECK |

FIG. 11

| DATA SIZE FOR CHECK |
|---|
| DATA FOR CHECK |

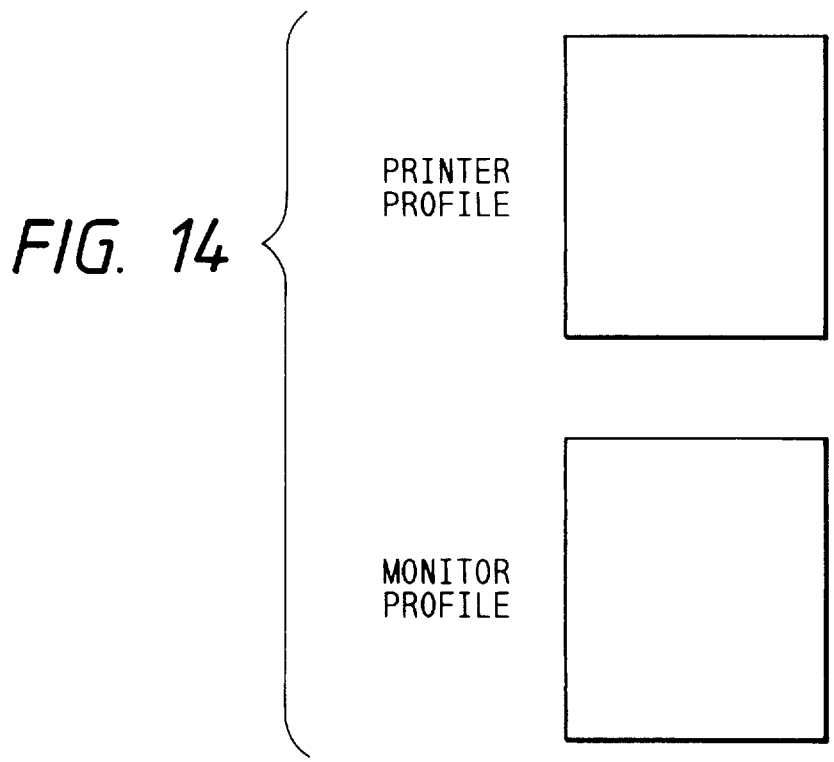

FIG. 32
PRIOR ART
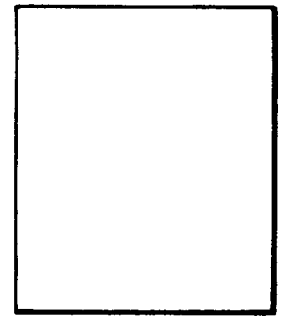
SCANNER PROFILE
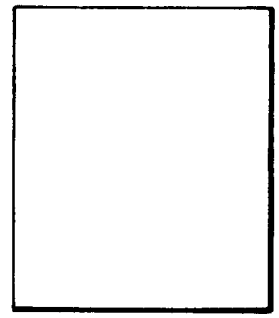
PRINTER PROFILE
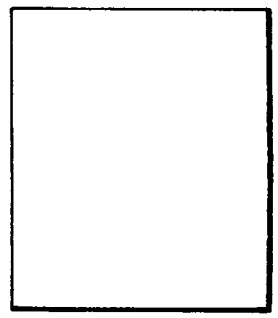
MONITOR PROFILE

FIG. 33

```
┌─────────────────────────────────────────────────┐
│              COLOR GAMUT CHECK                   │
│                                                  │
│  DESIGNATED                                      │
│  COLOR :                                         │
│                                                  │
│     R  [  255  ]              L*  [  50.00  ]   │
│                                                  │
│     G  [   0   ]              a*  [  42.09  ]   │
│                                                  │
│     B  [   0   ]              b*  [  21.38  ]   │
│                                                  │
│  BEFORE                       AFTER              │
│  CHECK :                      CHECK :            │
│                                                  │
│   [         ]                  [         ]       │
│                                                  │
│  COLOR                                           │
│  REPRODUCTION                 TARGET             │
│  CHECK METHOD :               PRINTER :          │
│                                                  │
│   [ HIGH SPEED   ▼]            [ CLC1      ▼]   │
│   [ HIGH ACCURACY ]            [ BJP1       ]   │
│                                [ BJP2       ]   │
│                                [ CLC2       ]   │
└─────────────────────────────────────────────────┘
```

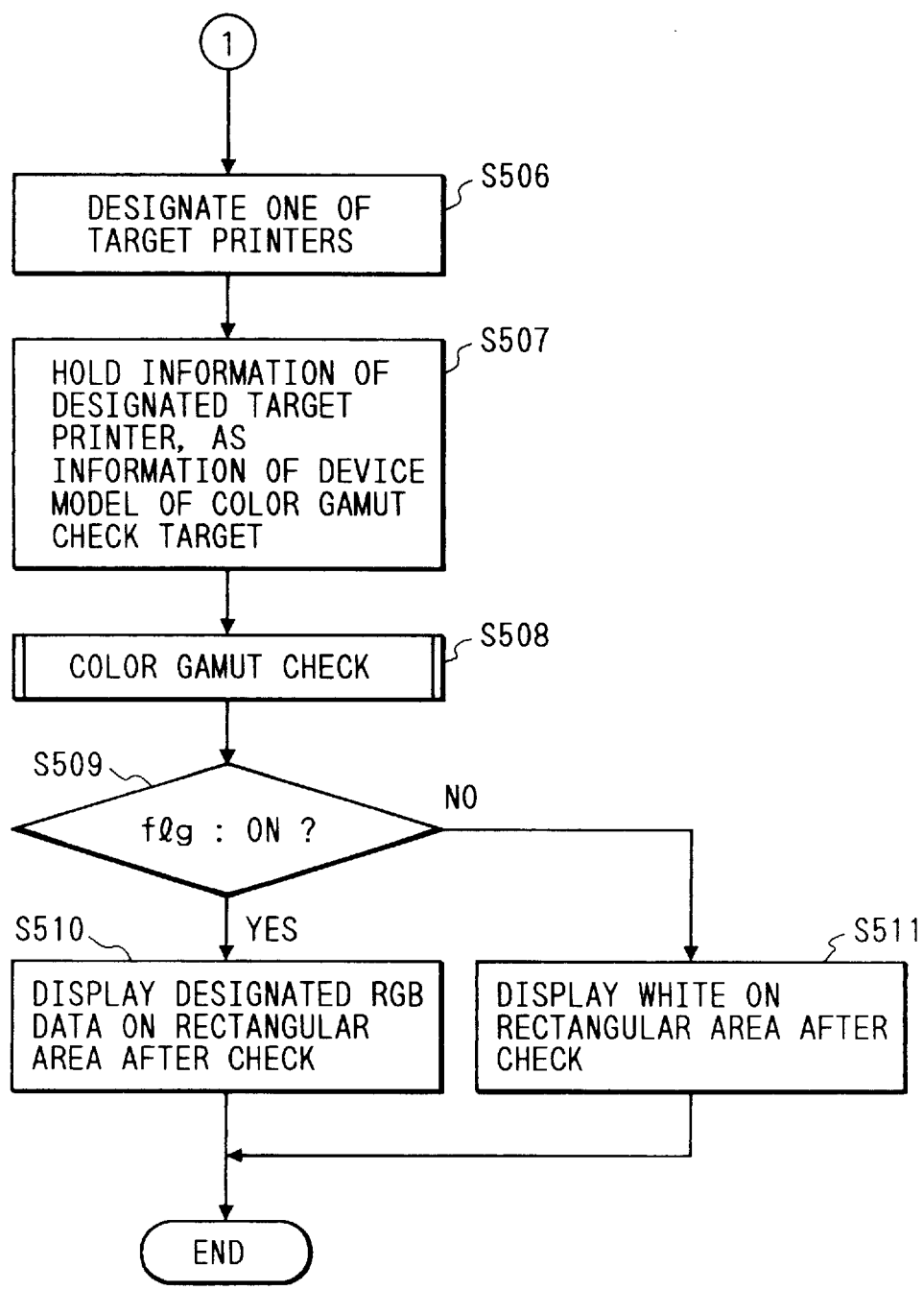

IMAGE PROCESSING APPARATUS AND METHOD

This application is a continuation of application Ser. No. 08/380,620, filed Jan. 30, 1995, now abandoned.

BACKGROUND OF THE INVENTION

1. Field of the Invention

The present invention relates to an image processing apparatus and method for performing image processing in the color management system which can make color reproduction with fidelity.

2. Related Background Art

As shown in FIG. 30, the color gamut may differ depending on the device such as a scanner, a monitor or a printer.

In FIG. 30, x, y indicate chromaticity coordinates, wherein the interior of the figure is a color gamut.

Namely, to make color reproduction by absorbing the difference between color gamuts, it is difficult to deal with a color in the uncommon area.

For example, considering the conversion from the monitor color space to the printer color space, it is difficult to determine what color the printer should use to represent a color residing within the color gamut of monitor but outside the color gamut of the printer.

The processing regarding this is referred to as a color space compression processing.

In addition to the main function such as a color space compression processing for making color reproduction with fidelity by considering the characteristics of color input/output device, the color management system has a device color gamut check function for checking to see whether or not a certain color is reproducible with the corresponding output device. This is a function for use in determining whether or not the color data which the application software has is reproducible with the output device (printer, monitor, etc.).

A specific method has been proposed by the present applicant, as shown in FIG. 31.

This is a method of defining a color gamut of a printer with a color reproduction solid comprising a hexahedron surrounded by apexes of Red, Green, Blue, Cyan, Magenta, Yellow, White and Black, dividing each face into two triangles to obtain a total of twelve planes, and determining whether the image data is inside or outside each of the planes, thereby determining whether it is inside or outside the color gamut.

In the color space conversion process between devices such as a scanner, a monitor or a printer, the processing to be performed, including the color space compression, does not depend on the device, but the information for use with the processing depends on the device.

Also, the information of the device color gamut check depends on the device.

The two pieces of information as above are stored in a file referred to as a device profile.

For example, a monitor profile stores x, y chromaticity values of Red, Green, Blue and White of monitor, and the data describing the monitor characteristics such as data of gamma characteristic curves for Red, Green and Blue.

The device profile is referred to as a scanner profile, a monitor profile or a printer profile, corresponding to each device, as shown in FIG. 32.

In the color space conversion described above, processing is conducted using a profile corresponding to a source device for conversion and a profile corresponding to a destination device after conversion. The former profile is referred to as a source profile and the latter profile as a destination device profile.

For example, in the conversion from the scanner color space to the monitor color space, the source device is a scanner, with the profile of the scanner being a source profile, and the destination device is a monitor, with the profile of the monitor being a destination profile.

The above method has a drawback in that since the color gamut check method was predefined, the user could not select any color gamut check method as desired.

SUMMARY OF THE INVENTION

It is an object of the present invention to provide an image processing apparatus and method in which the above problem has been resolved.

Also, it is another object of this invention to perform the color gamut check using any color gamut check method in accordance with particular uses and function.

Also, it is a further object of the invention to allow the user to recognize the state of input image data by reporting a check result to the user.

Also, it is another object of the invention to allow the user to perform subsequent image processing based on a portion outside the color gamut.

To accomplish such objects, according to a preferred embodiment of the present invention, there is provided an image processing apparatus comprising designating means for designating a color gamut check method, and checking means for checking input image data based on said designated color gamut check method.

Other objects and features of the present invention will be more apparent from the following description of the embodiment and the drawings.

BRIEF DESCRIPTION OF THE DRAWINGS

FIG. 2 is a block diagram showing the circuit configuration of an image processing system in one example of the invention;

FIG. 5 shows a relational expression between XYZ data and RGB data as determined by CIE;

FIG. 6 shows an example of the conversion from XYZ data to L*a*b* as determined by CIE;

FIG. 10 illustrates the structure of a header information unit;

FIG. 11 illustrates the structure of an information storage unit for device color gamut;

FIG. 14 illustrates the cases wherein when there are a plurality of color gamut check methods, the output device having the information of its processing has only one profile;

FIG. 15 is a diagram illustrating the structure of a header information unit;

FIG. 32 illustrates three kinds of device profiles;

FIG. 33 is a view illustrating a user interface for application software which allows the user to select a color gamut check method and the information of a target device model for color gamut check;

FIG. 35 is a part of the flowchart of the processing for making the color gamut check using the user interface of FIG. 33.

DETAILED DESCRIPTION OF THE PREFERRED EMBODIMENTS

Figure 1:
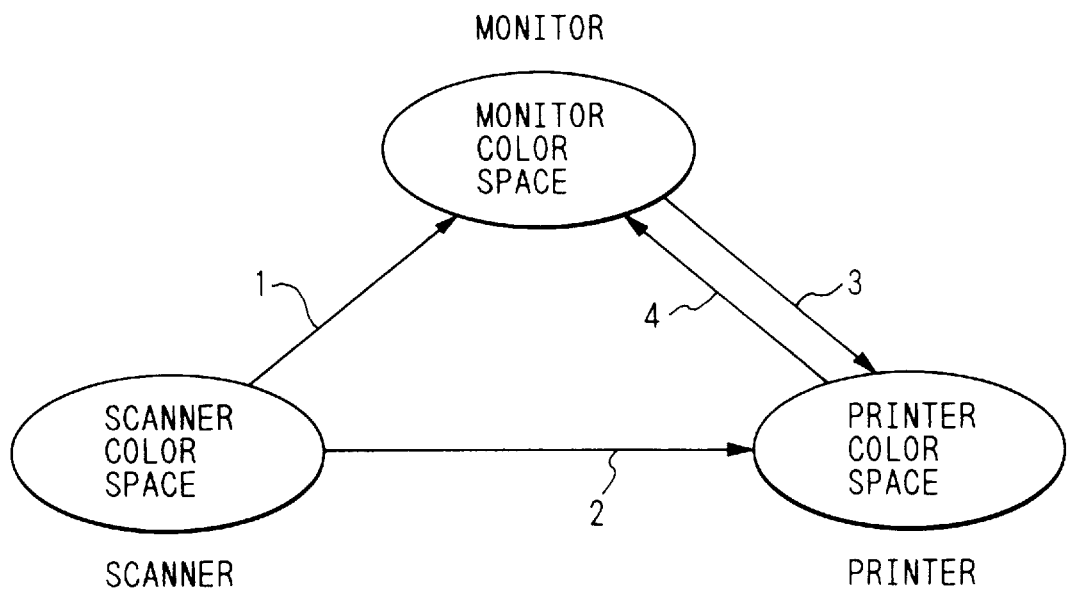
FIG. 1 is a diagram illustrating color reproduction in a color management system.

FIG. 1 shows an example of color reproduction in a color management system. Herein, three basic color input/output devices are considered, including a color scanner, a color monitor and a color printer.

In the color management system, the color reproduction processing in consideration of the characteristics of such three devices is needed, and can be stated as the following four color space conversion processings as indicated by the arrow in FIG. 1.

1. Conversion processing from scanner color space to monitor color space

To display photographic data read by the scanner with fidelity on the monitor.

2. Conversion processing from scanner color space to printer color space

To print photographic data read by the scanner with fidelity by the printer.

3. Conversion processing from monitor color space to printer color space

To print data such as characters or graphics created using the application software on the monitor with fidelity by the printer.

4. Conversion processing from printer color space to monitor color space

To preview the result printed by the printer on the monitor.

Herein, the color space of each of the above three devices depends on each device, with the reproducible color gamut being different.

Thus, a color gamut check function is provided for determining whether or not the input image data is reproducible with the target output device such as a monitor or a printer. This function can inform the user of the portion outside the color gamut. Or based on its judgement, image processing such as color space compression is performed, and all the input image data is converted within the color gamut of the output device.

With the processing regarding a series of color managements as above described, it is possible to obtain a reproduced image with fidelity as complete to the input image as possible with the output device.

One example of the present invention, which involves an image processing apparatus for making the above-described color gamut check, is presented below.

FIG. 2 is a block diagram showing the circuit configuration of an image processing system in the example of the invention.

As shown in FIG. 2, the image processing system in this example is comprised of a color monitor 1, a host computer 2 and a color printer 3.

The host computer 2 processes the image data, and causes the color monitor 1 to display its results, or the color printer 3 to print it.

That is, the host computer 2 comprises a monitor interface 21 for allowing the data transmission or reception to or from the color monitor, a VRAM 22 for use with the monitor display, a CPU 23 composed of a ROM and a RAM for controlling the entirety, a frame memory 24 for use with the monitor display, a print buffer 25 for use with the printer output, a printer interface 26 for allowing the data transmission or reception to or from the color printer 3, a device profile storage unit 27 in which device files containing the information such as a color gamut information table are stored, a color gamut check unit 28 for determining whether or not the input color image data is within the color gamut, a color conversion unit 29 for making the color space conversion regarding the color reproduction, a color reproduction processing unit 2a for making the color reproduction processing based on the result determined by the color gamut check unit 28, a data bus 2b, an operation unit 2c for allowing the user to enter a command by the use of a mouse or a keyboard, and a scanner interface 2d for making the data transmission or reception to or from the scanner 4.

Herein, it is noted that the color reproduction processing unit includes the color reproduction processing such as a color space compression processing regarding the color management.

Figure 3:
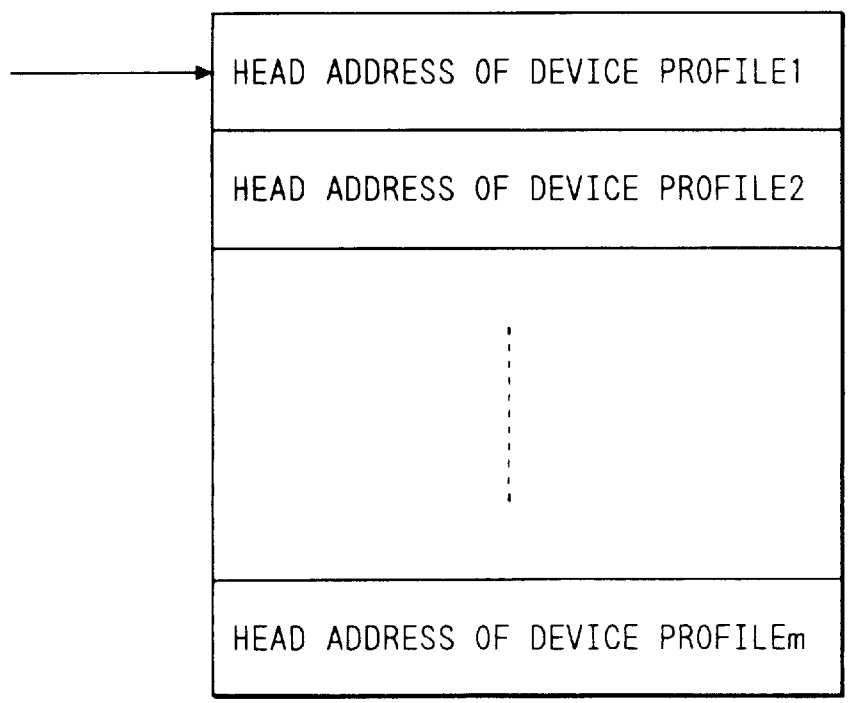
FIG. 3 is a diagram showing a profile address table.

FIG. 3 shows an example of a profile address table stored in the device profile storage unit 27. A total of m (constant) device profiles are stored therein.

Figure 4:
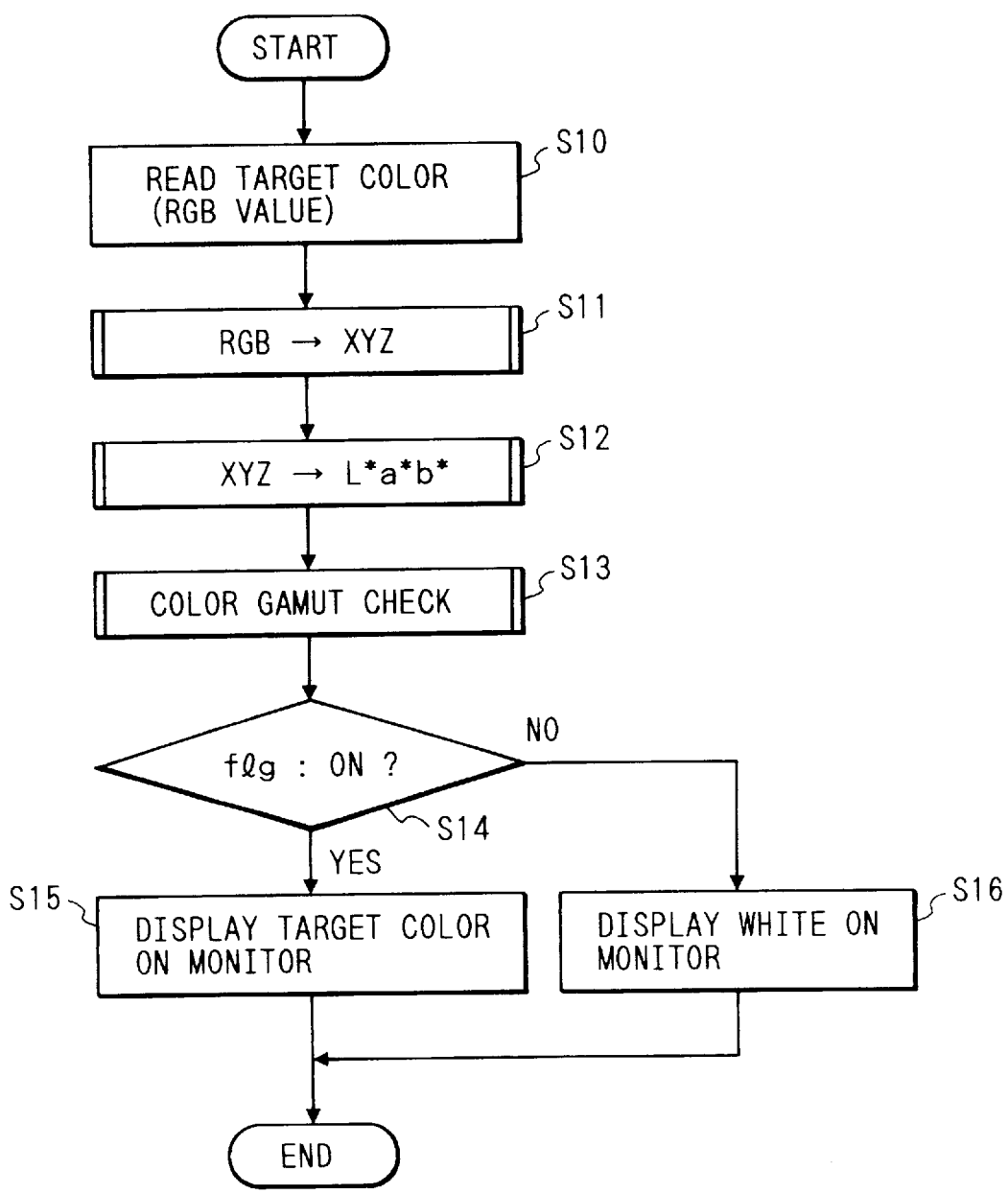
FIG. 4 is a process flowchart for checking to see whether or not color image data created by application software on a color monitor 1 is within a color gamut of color monitor 1 or color printer 3, and determining whether or not to display an image on the color monitor 1 based on its result.

FIG. 4 is a flowchart of a processing for checking to see whether or not the color image data (R, G, B luminance data) created by the application software on the color monitor 1 is within the color gamut of color monitor 1 or color printer 3 in the color gamut check unit 28, and based on its result, determining whether or not to display on the color monitor 1.

At step S10, the target color (a set of R, G, B luminance data) which is subjected to the color gamut check is read, and the routine proceeds to step S11.

Herein, the target color is RGB data which depends on the display characteristics of color monitor 1 such as gamma characteristics, and is defined calorimetrically (with clear chromaticity values of R, G, B and White).

At step S11, read RGB data is converted into XYZ data determined by CIE in the color conversion unit 29, and the routine proceeds to step S12.

At step S12, XYZ data is converted into L*a*b* data in the color conversion unit 29, and the routine proceeds to step S13.

At step S13, a check is made in the color gamut check unit 28 to determine whether or not converted L*a*b* data is reproducible by the color printer 3, based on the information stored in the device profile storage unit 27. If the target color is reproducible, flg is set on, or otherwise, flg is left off.

At step S14, a check is made to determine whether or not the flg set at step S13 is on.

If it is not on, the target color is displayed on the monitor at step S16, and the processing is ended.

If it is on, processing proceeds to step S15, the target color is displayed directly on the monitor, and the processing is ended.

Accordingly, if the target color is within the color gamut of the output device such as a color monitor 1 or a color printer 3 (flg on), the target color can be displayed with fidelity on the color monitor 1, and thus is directly displayed. If the target color is outside the color gamut (flg off), the target color is displayed in white on the color monitor 1, whereby the user is informed whether the target color is inside or outside the color gamut, and thus can recognize what color in which portion a displayed image is outside the color gamut.

While the target color outside the color gamut is displayed in white in this example, it should be noted that it is only necessary to inform the user that the target color is outside the color gamut, and the target color may be displayed in black.

Since RGB data of the target color is defined calorimetrically (with clear chromaticity values of R, G, B, White), the relational expression of FIG. 5 with respect to XYZ data determined by CIE holds.

This relational expression of FIG. 5 can be employed for the process at step S11 of FIG. 4. Herein, $P_{ij}$ (i, j=1, 2, 3) are constants determined by the colorimetrical definition of monitor RGB for the color monitor 1, respectively.

FIG. 6 shows an example of the process at step S12 of FIG. 4.

Herein, Xn, Yn, Zn are values determined by which standard light source determined by CIE is followed.

The processing at step S13 in FIG. 4 is to check the color gamut by inputting L*a*b* data values of target color obtained at step S12 to output its result as the value of flg.

In the following, two examples will be described in which the color gamut check in accordance with the use by the user can be effected by having a plurality of color gamut check methods.

(Example 1)

Example 1 is one in which the information of a plurality of color gamut checks is stored as independent device profiles in the device profile storage unit 27.

That is, this example holds a device profile for each color gamut check.

Figure 8:
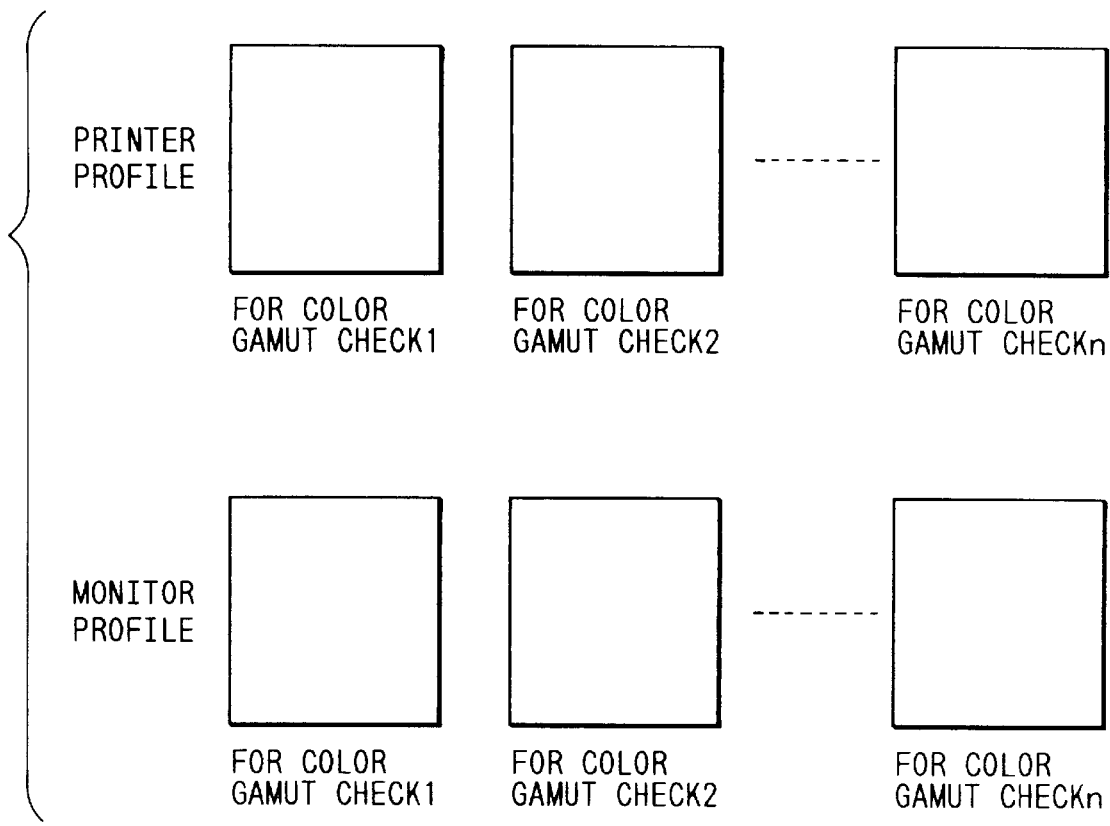
FIG. 8 illustrates the cases in which when there are a plurality of color gamut check methods, the output device having its processing information has a plurality of profiles.

FIG. 8 shows that when there are n (n: constant) kinds of color gamut check methods having the features of high accuracy or high speed, the number of profiles for the output device is n at maximum.

It is noted herein that the scanner is not an output device, and is excluded.

By having a plurality of device profiles, when a variation is made for each method, for example, when a new color gamut check method is stored as the profile, it is only necessary to change the method in a unit of profile, which can be easily dealt with.

Figure 9:
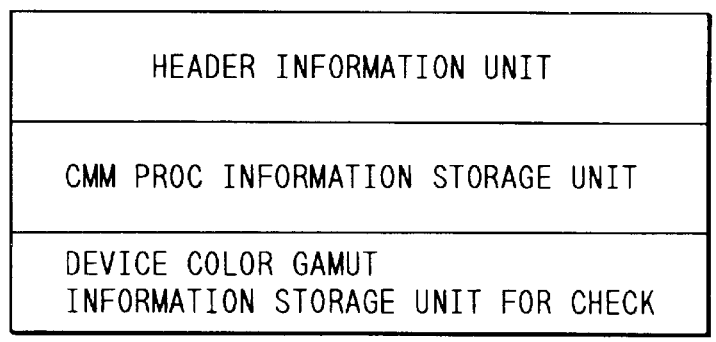
FIG. 9 illustrates the structure of a profile.

FIG. 9 shows an example of the profile structure.

Herein, it is composed of three areas including a header information unit for storing the management information of profile, a CMM processing information storage unit for storing the information for CMM processing, and a device color gamut information storage unit for storing the information for device color gamut check.

FIG. 10 shows the structure of the header information unit.

Herein, it stores a device model as the profile target device information, a data size as the profile data size information, a version for the profile management, a CMM Subtype as the CMM processing type information, a Gamutchecktype as the information of which device color reproduction check method the profile corresponds to, an offset value for the CMM processing information storage unit of FIG. 9, and an offset value for the information storage unit for device color gamut check of FIG. 9.

FIG. 11 shows the structure of the information storage unit for device color gamut check of FIG. 9.

Herein, it stores the data size for color gamut check to which the profile corresponds and data for check.

Figure 12:
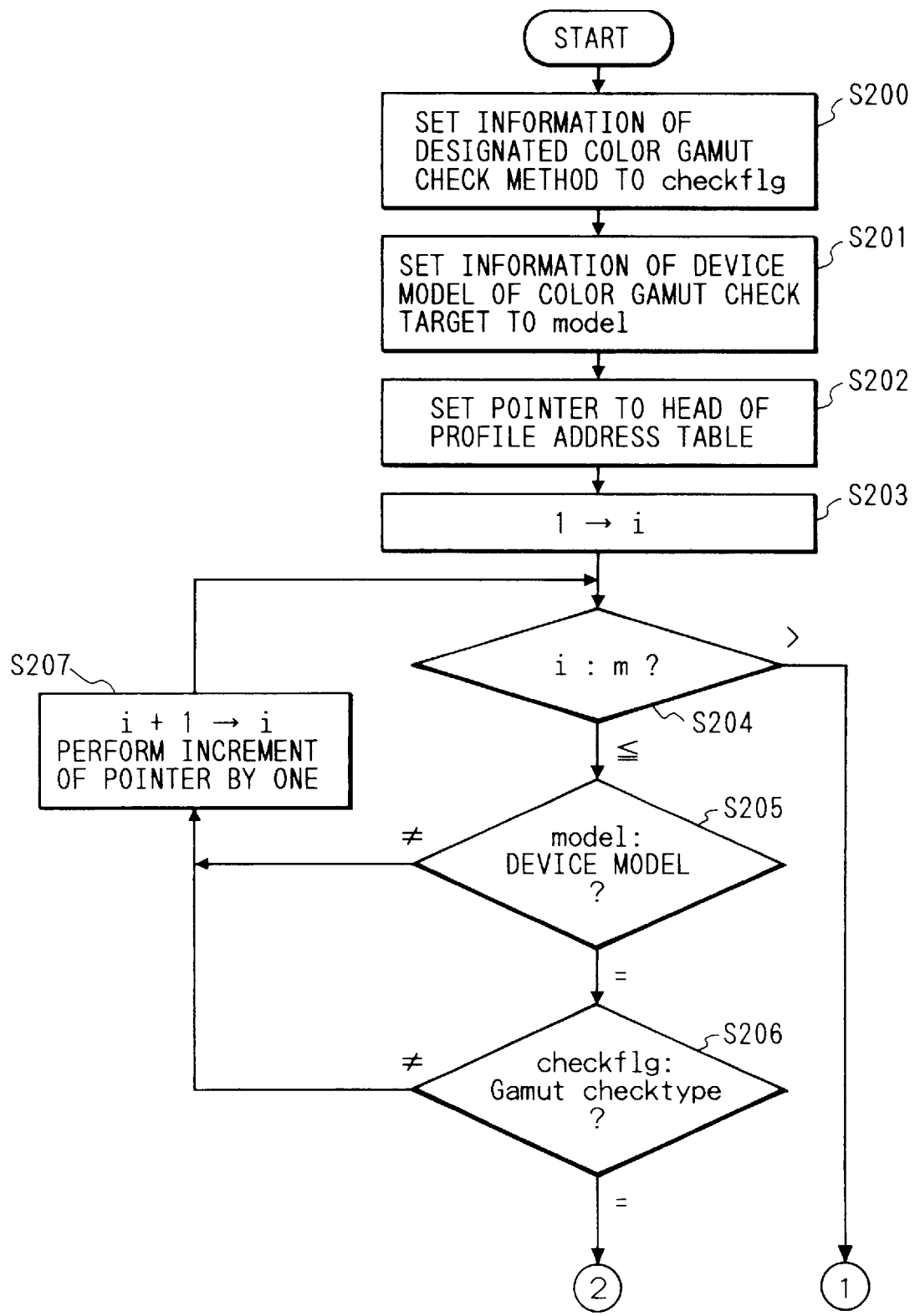
FIG. 12 is a flowchart of a processing for fetching the information for a selected color gamut check method from a corresponding device profile as shown in FIGS. 8 to 11 to determine whether or not input color image data is within the color gamut.
Figure 13:
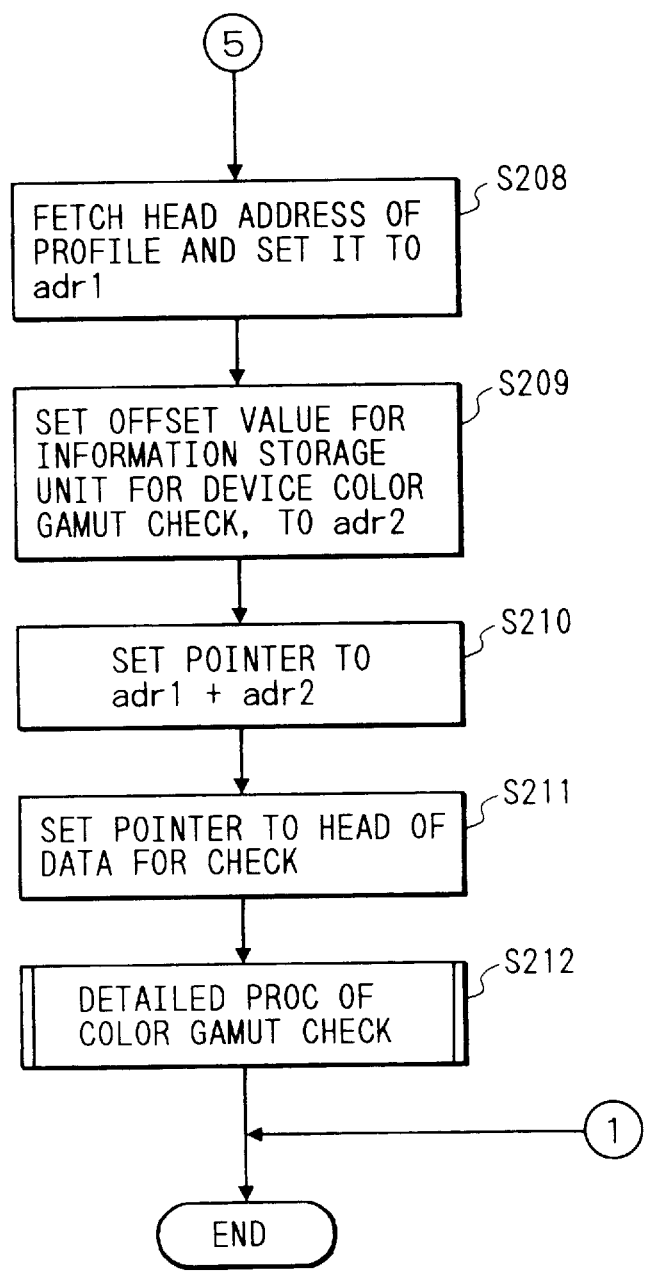
FIG. 13 is a flowchart of the processing for fetching the information for the selected color gamut check method from the corresponding device profile as shown in FIGS. 8 to 11 to determine whether or not input color image data is within the color gamut.

FIGS. 12 and 13 are the flowcharts exemplifying the processing for fetching the information for a selected color gamut check method from the corresponding device profile as shown in FIGS. 8 to 11 in the color gamut check unit 28, and determining whether or not the input color image data is within the color gamut.

At step S200, the information for the color gamut check method designated on the operation unit 2c by the user is set to checkflg, and the routine proceeds to step S201.

At step S201, the information of device model of color gamut check target is set to model, and the routine proceeds to step S202.

At step S202, the pointer is set to the head of profile address table of FIG. 3, and the routine proceeds to step S203.

At step S203, 1 is set to constant i, and the routine proceeds to step S204.

At step S204, the value of i and the value of m (constant) indicating the number of profiles are compared.

If i is greater than m, the processing is ended.

Otherwise, the routine proceeds to step S205, where the device model information fetched from the header information unit based on the head address of profile indicated by the pointer and model are compared.

If they are not equal, the routine proceeds to step S207, where i and the pointer are each incremented by one, and returns to step S204.

If they are equal at step S205, the routine proceeds to step S206, where Gamutchecktype fetched from the header information unit based on the head address of profile indicated by the pointer and checkflg are compared.

If they are not equal, the routine proceeds to step S207, where i and the pointer are each incremented by one, and returns to step S204.

If they are equal at step S206, the routine proceeds to step S208, where the head address of profile is fetched and set to adr1, and the routine proceeds to step S209.

At step S209, the offset value for the information storage unit for device color gamut check is set in adr2, and the routine proceeds to step S210.

At step S210, the pointer is set to adr1+adr2, and the routine proceeds to step S211.

At step S211, the pointer is set to the head of data for check in the information storage unit for device color gamut check of FIG. 11, and the routine proceeds to step S212.

At step S212, the color gamut check processing based on Gamutchecktype of the data for check is performed, using the data for check indicated by the pointer, in the color gamut check unit 28.

In this way, by selecting an independent device profile having information corresponding to a designated method for a designation of the color gamut check method, and performing the color gamut check processing based on the designated Gamutchecktype using the internal information thereof, it is possible to determine whether or not the input color image data is within the color gamut.

(Example 2)

Example 2 is one in which the information of a plurality of color gamut checks is stored in one device profile.

That is, the information of a plurality of color gamut checks is stored in a device profile for each device.

Accordingly, FIG. 14 shows in the above case that even if there are n (n: constant) kinds of color gamut check methods, the number of profiles for the output device is equal to one.

It is noted herein that the scanner is not an output device, and is excluded.

One example of the profile structure is equivalent to that of FIG. 9.

By storing the information of a plurality of color gamut checks in one device profile, the management of information such as reading the information of a designated color gamut check can be facilitated.

Further, the color gamut of device may change over time, and can be managed for each device in changing the information indicating the color gamut of device, whereby the information can be changed simply.

FIG. 15 shows the structure of the header information unit of profile as shown in FIG. 9.

Herein, it stores a device model as the profile target device information, a data size as the profile data size information, a version for the profile management, a CMM Subtype as the CMM processing type information, an offset value for the CMM processing information storage unit of FIG. 9, and an offset value for the information storage unit for device color gamut check of FIG. 9.

Figure 16:
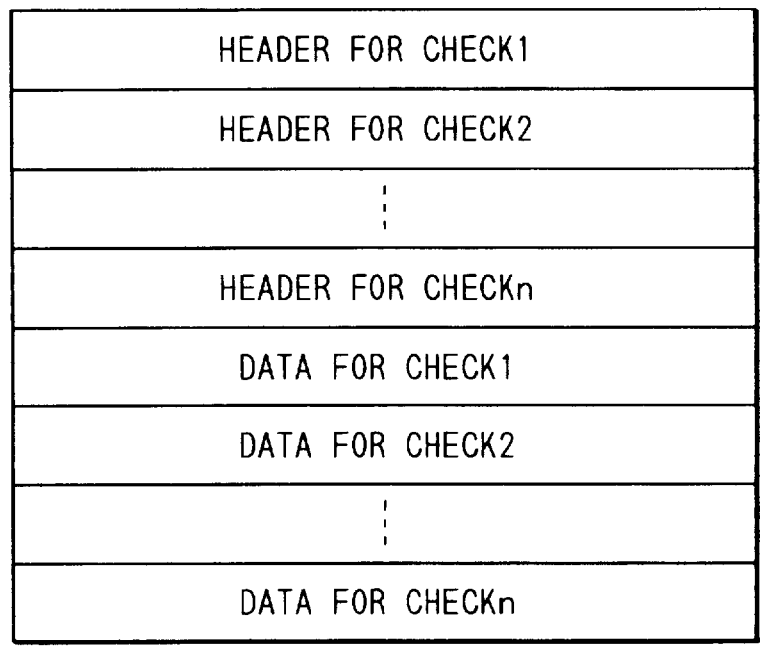
FIG. 16 is a diagram illustrating the structure of an information storage unit for device color gamut.

FIG. 16 shows the structure of the information storage unit for device color gamut check of FIG. 9.

Herein, it is composed of a header unit for managing the data for n (constant) kinds of color gamut check, and a data storage unit for check for storing the data for n (constant) kinds of color gamut check.

Figure 17:
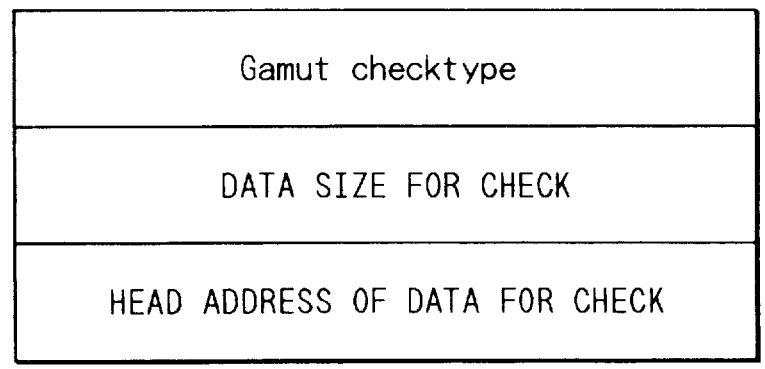
FIG. 17 is a diagram illustrating the structure of a check data storage unit.

FIG. 17 shows the structure of the data storage unit for check of FIG. 16.

Herein, it stores Gamutchecktype as the type information of device color gamut check method, the data size information for color gamut check, and the head address of data for color gamut check.

Figure 18:
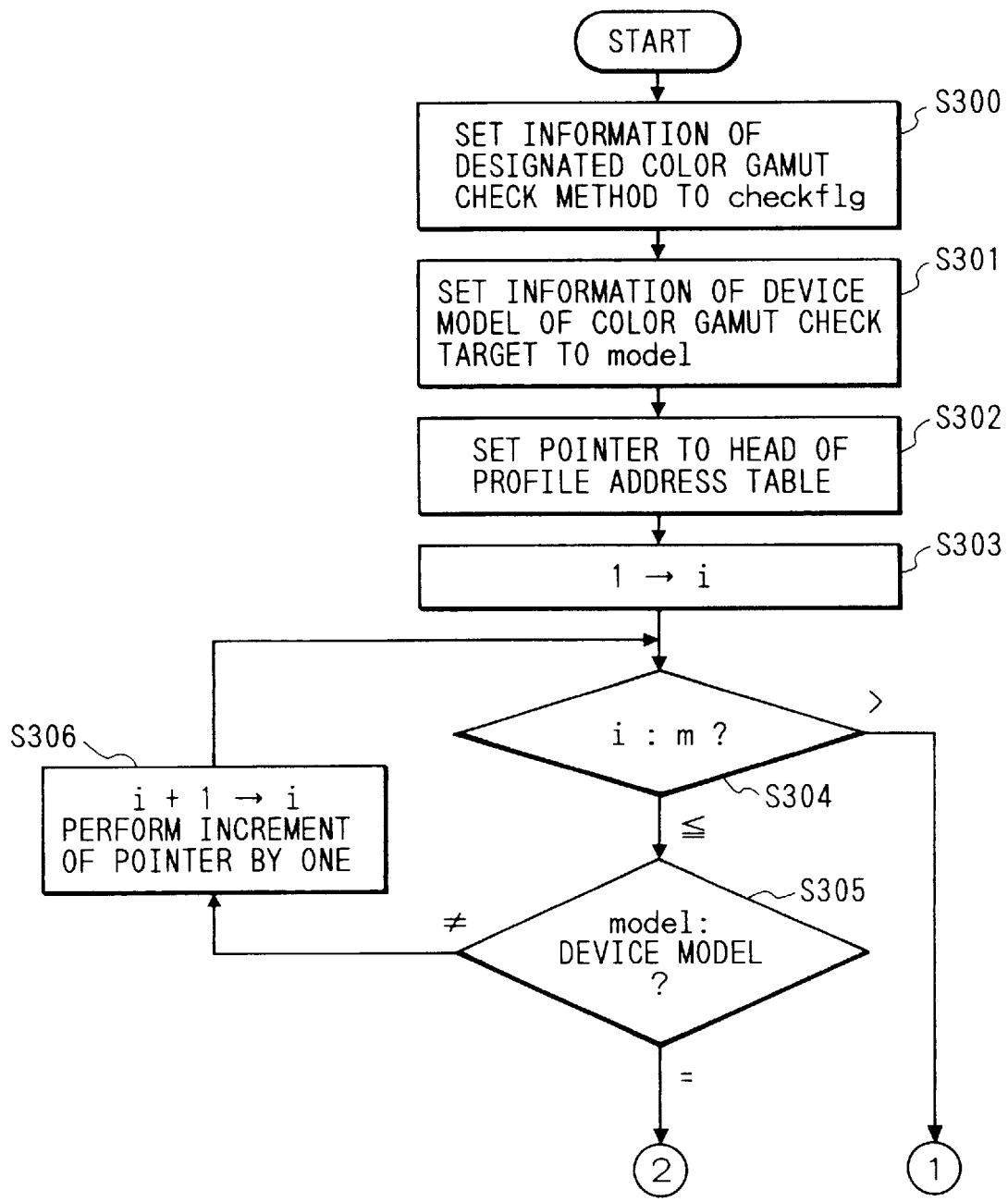
FIG. 18 is a flowchart of a processing for fetching the information for a selected color gamut check method from a corresponding device profile as shown in FIGS. 14 to 17 to determine whether or not input color image data is within the color gamut.
Figure 19:
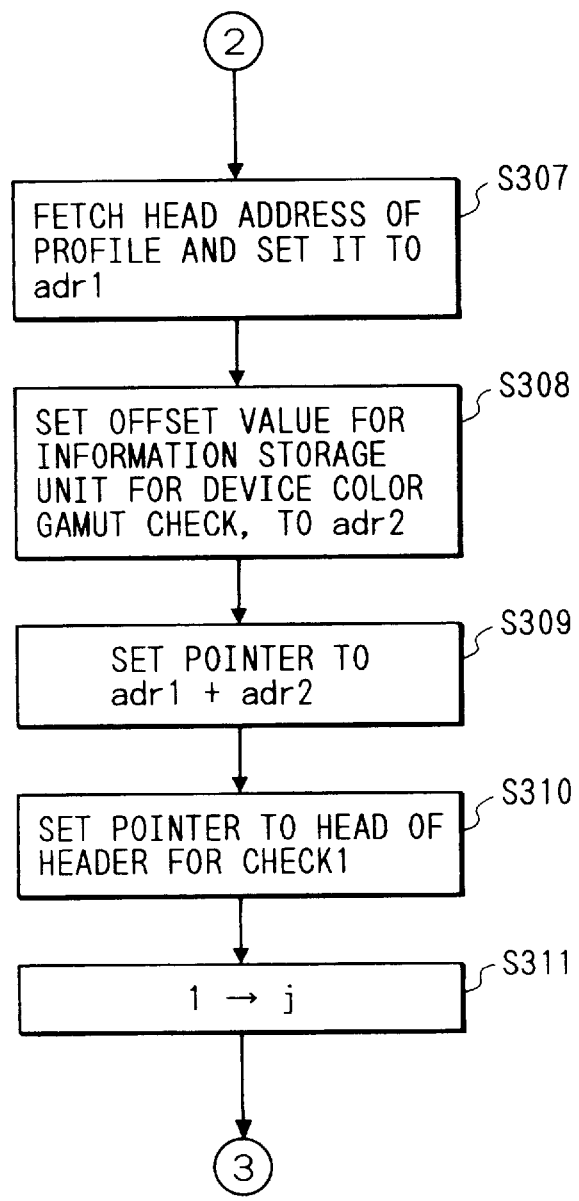
FIG. 19 is a flowchart of the processing for fetching the information for the selected color gamut check method from the corresponding device profile as shown in FIGS. 14 to 17 to determine whether or not input color image data is within the color gamut.
Figure 20:
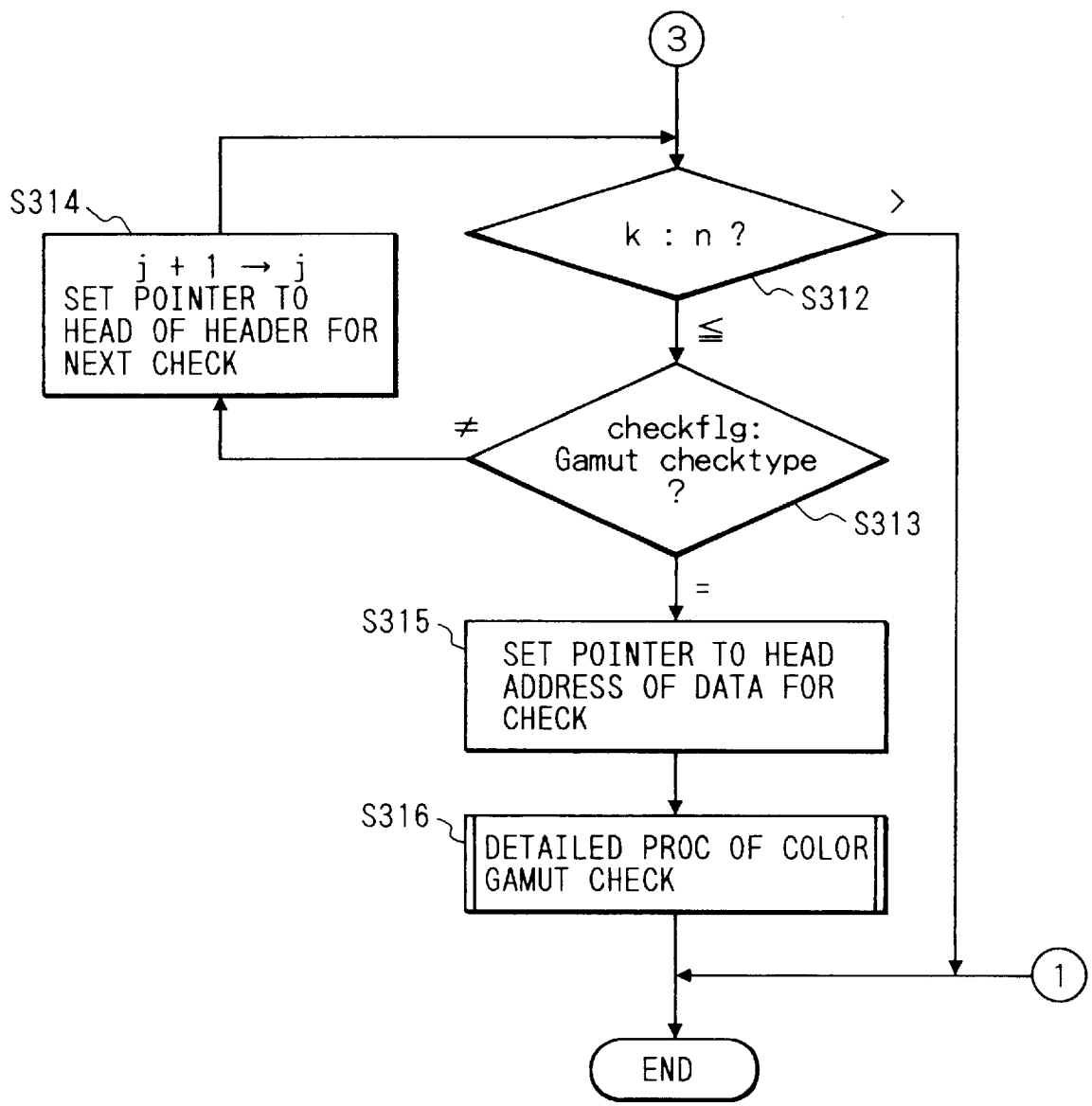
FIG. 20 is a flowchart of the processing for fetching the information for the selected color gamut check method from the corresponding device profile as shown in FIGS. 14 to 17 to determine whether or not input color image data is within the color gamut.

FIGS. 18 to 20 are the flowcharts exemplifying the processing for fetching the information for a selected color gamut check method from the corresponding device profile as shown in FIGS. 14 to 17 in the color gamut check unit 28, and determining whether or not the input color image data is within the color gamut.

At step S300, the information for the color gamut check method designated on the operation unit 2c by the user is set to checkflg, and the routine proceeds to step S301.

At step S301, the information of device model of color gamut check target is set to model, and the routine proceeds to step S302.

At step S302, the pointer is set to the head of profile address table of FIG. 3, and the routine proceeds to step S303.

At step S303, 1 is set to constant i, and the routine proceeds to step S304.

At step S304, the value of i and the value of m (constant) indicating the number of profiles are compared.

If i is greater than m, the processing is ended.

Otherwise, the routine proceeds to step S305, where the device model information fetched from the header information unit based on the head address of profile indicated by the pointer and model are compared.

If they are not equal, the routine proceeds to step S306, where i and the pointer are each incremented by one, and returns to step S304.

If they are equal at step S305, the routine proceeds to step S307, where the head address of the profile is fetched and set to adr1, and then proceeds to S308.

At step S308, the offset value for the information storage unit for device color gamut check is set to adr2, and the routine proceeds to step S309.

At step S309, the pointer is set to adr1+adr2, and the routine proceeds to step S310.

At step S310, the pointer is set to the head of data for check in the information storage unit for device color gamut check of FIG. 16, and the routine proceeds to step S311.

At step S311, l is set to constant j, and the routine proceeds to step S312.

At step S312, the value of j and the value of n (constant) indicating the number of kinds of color gamut check are compared.

If j is greater than n, the processing is ended.

Otherwise, the routine proceeds to step S313, where Gamutchecktype fetched from the header until for check and checkflg are compared.

If they are not equal, the routine proceeds to step S314, where j is incremented by one, and the pointer is set to the head of header for next check, and returns to step S312.

If they are equal at step S313, the routine proceeds to step S315, where the pointer is set to the head address of the data for check within the header for check indicated by the pointer and data is fetched, and then proceeds to step S316.

At step S316, the color gamut check processing based on Gamutchecktype of the data for check is performed, using the data for check indicated by the pointer, in the color gamut check unit.

In this way, by fetching the information corresponding to a designated method from within the device profile for a designation of the color gamut check method, and making the color gamut check processing based on the designated Gamutchecktype using its information, it is possible to determine whether or not the input color image data is within the color gamut.

The processings at step S212 of FIG. 13 and step S316 of FIG. 20 employ a designated Gamutchecktype method among a plurality of color gamut check methods.

Hence, the user can designate a desired method from among a plurality of color gamut check methods having the feature of high accuracy or high speed, thereby effecting the color gamut check processing according to the uses of the user.

Next, one example of the information indicating the color gamut of the output device such as a printer or a monitor on the L*a*b* color space will be described.

The color gamut of the output device is necessarily included in the L*a*b* color solid. Accordingly, the color gamut of the output device can be defined by dividing a three dimensional color solid of L*a*b* into lattices at an equal interval ($\Delta L^*$, $\Delta a^*$, $\Delta b^*$) in each direction of coordinate axis and using the lattices.

Note that each of the values of $\Delta L^*$, $\Delta a^*$ and $\Delta b^*$ which are discrete data may be a minimum interval or a predetermined interval which each data can take.

Also, each of the values of $\Delta L^*$, $\Delta a^*$ and $\Delta b^*$ may not be provided at an equal interval.

The color gamut check processing may differ in processing time and accuracy, depending on the information indicating the color gamut of the output device.

Among a plurality of color gamut check methods, two specific examples of having slightly lower check accuracy but shorter processing time and having higher check accuracy but longer processing time are presented below.

[Example of processing having slightly lower check accuracy but shorter processing time]

Figure 21:
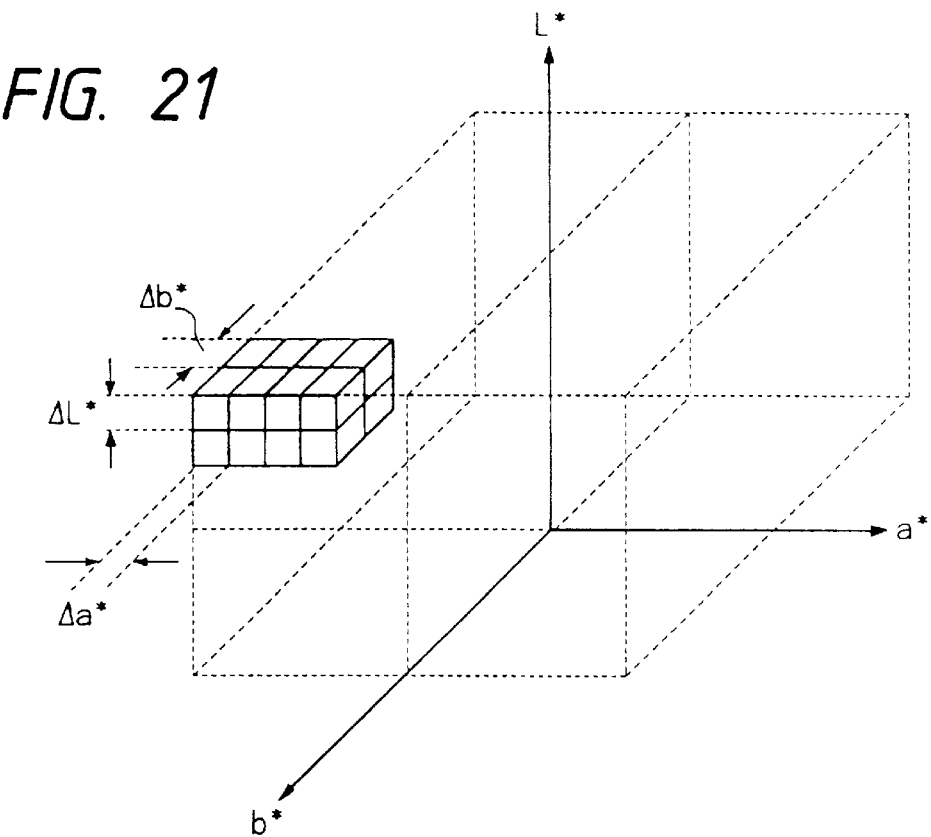
FIG. 21 is a view showing a three-dimensional color solid of L*a*b* constituted by space lattices at an equal interval ($\Delta L^*$, $\Delta a^*$, $\Delta b^*$) in each direction of the coordinate axes.

FIG. 21 shows a three dimensional color solid of L*, a* and b* composed of space lattices at an equal interval ($\Delta L^*$, $\Delta a^*$, $\Delta b^*$) in each direction of the coordinate axes.

By slicing the above three dimensional color solid in a direction perpendicular to L*, a two dimensional plane of a*, b* composed of rectangular (square in this case) lattices results.

Figure 22:
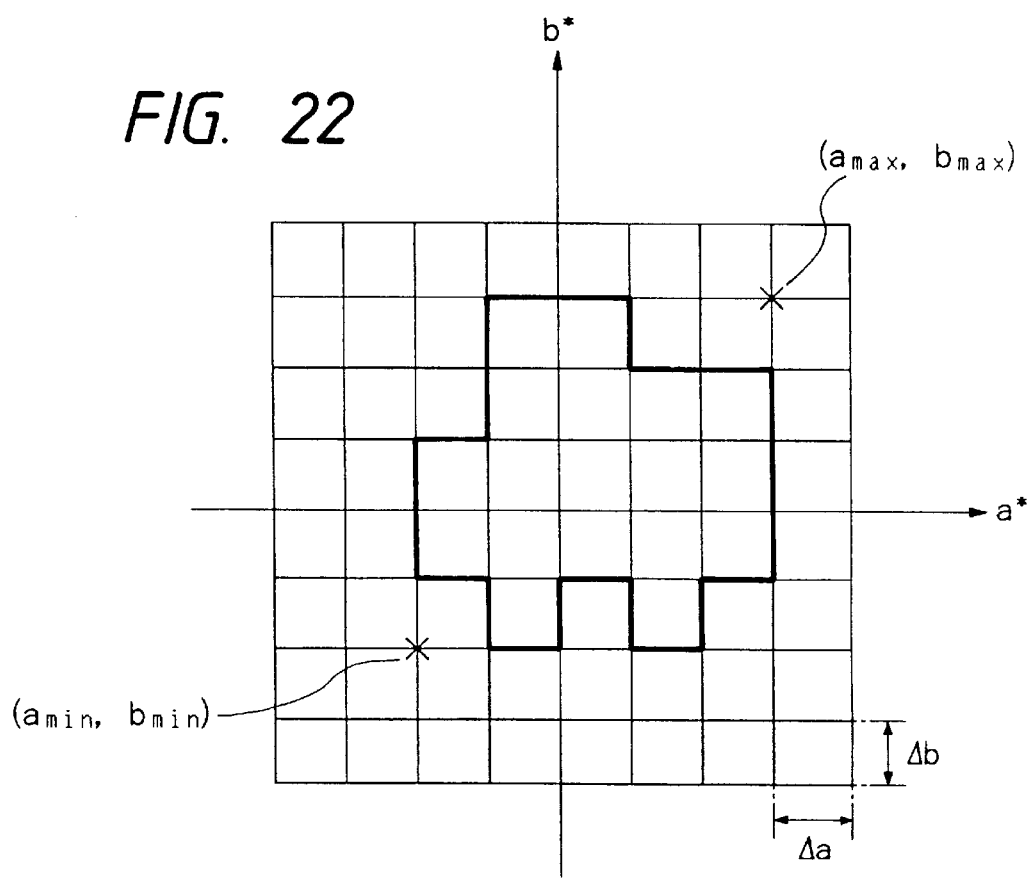
FIG. 22 is a view showing an instance of defining the monitor or printer gamut by a rectangular area in a two-dimensional plane of a* and b* constituted of rectangular lattices obtained by slicing the three-dimensional color solid in a direction perpendular to L*.

Herein, the lengths of two sides of lattices are $\Delta a^*$ and $\Delta b^*$ as shown in FIG. 22.

Also, the area surrounded by the bold line represents a range of lattices within which the color gamut of monitor or printer is included on the sliced plane for L*.

Figure 7:
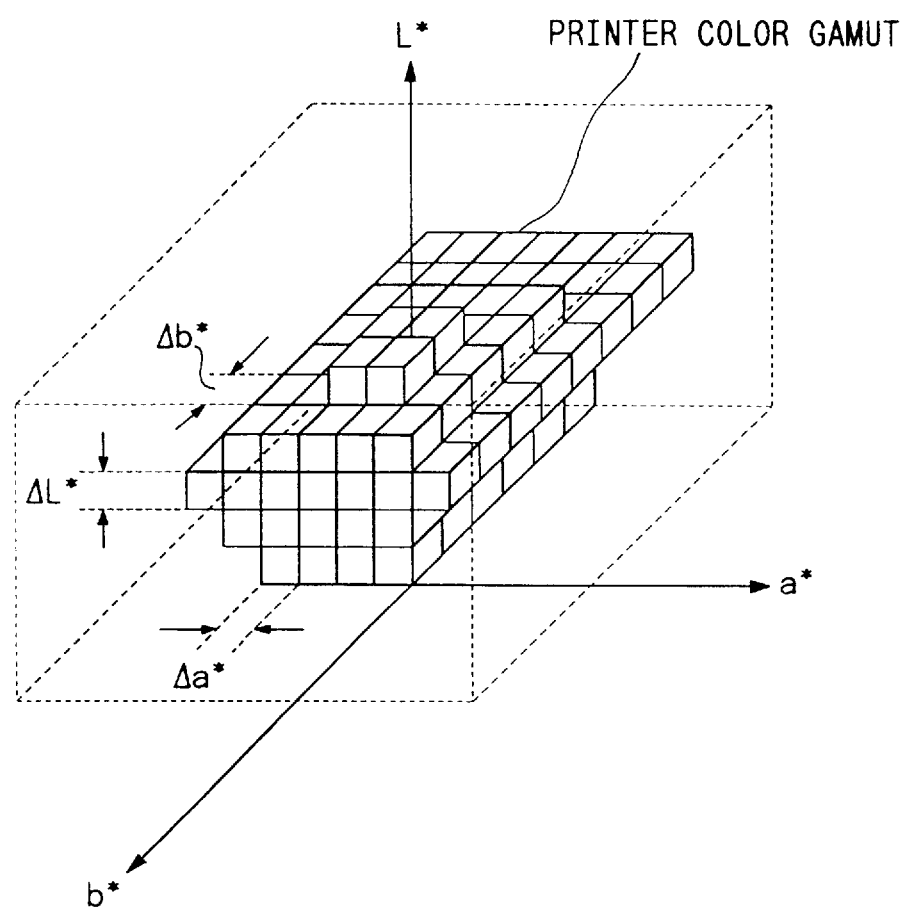
FIG. 7 is a view illustrating a color gamut of printer within an L*a*b* color solid.

As seen from FIG. 7, the above range of lattices will differ with the value of L*.

This exemplary method is a method of defining the color gamut of a monitor or a printer with rectangular areas all encompassing the area surrounded by the bold line in FIG. 22 and making the color gamut check based on its information.

A rectangular area is defined by two points ($a_{max}$, $b_{max}$) and ($a_{min}$, $b_{min}$) in FIG. 22.

Figure 23:
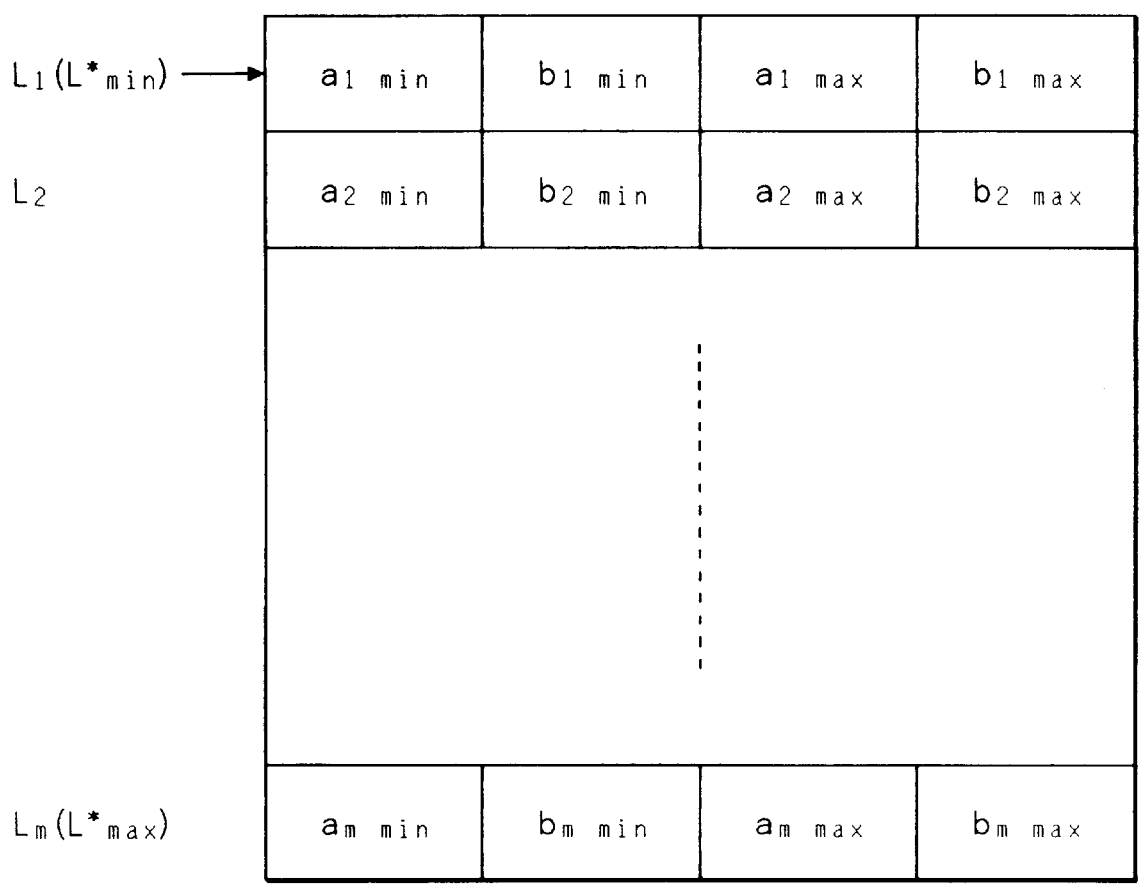
FIG. 23 shows a table of color gamut information wherein the color gamut of a monitor or a printer is defined in bold line by rectangular areas.

Since the size of rectangle may differ with the value of L*, the color gamut information table is as shown in FIG. 23.

This table is stored in the data for check in FIG. 11 or the storage unit for the data for check in FIG. 17.

The range of L* is from $L^*_{min}$ to $L^*_{max}$, and for each L*, the values of coordinates ($a_{max}$, $b_{max}$), ($a_{min}$, $b_{min}$) which define the size of the above rectangle are stored.

Herein, the number of Ls in a range from $L^*_{min}$ to $L^*_{max}$ is m (constant).

Figure 24:
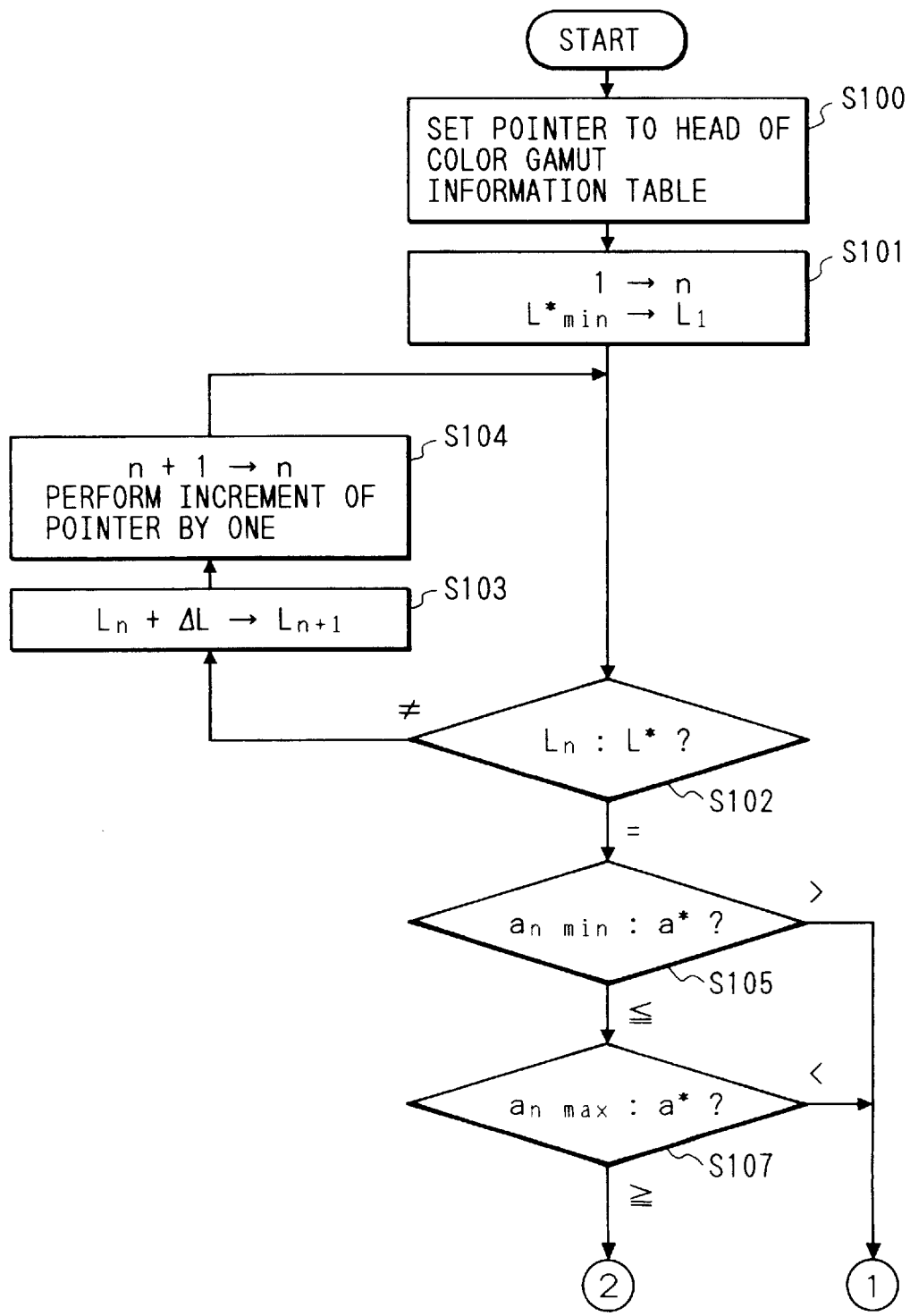
FIG. 24 is a flowchart of a processing for making a color gamut check based on the color gamut information table of FIG. 23.
Figure 25:
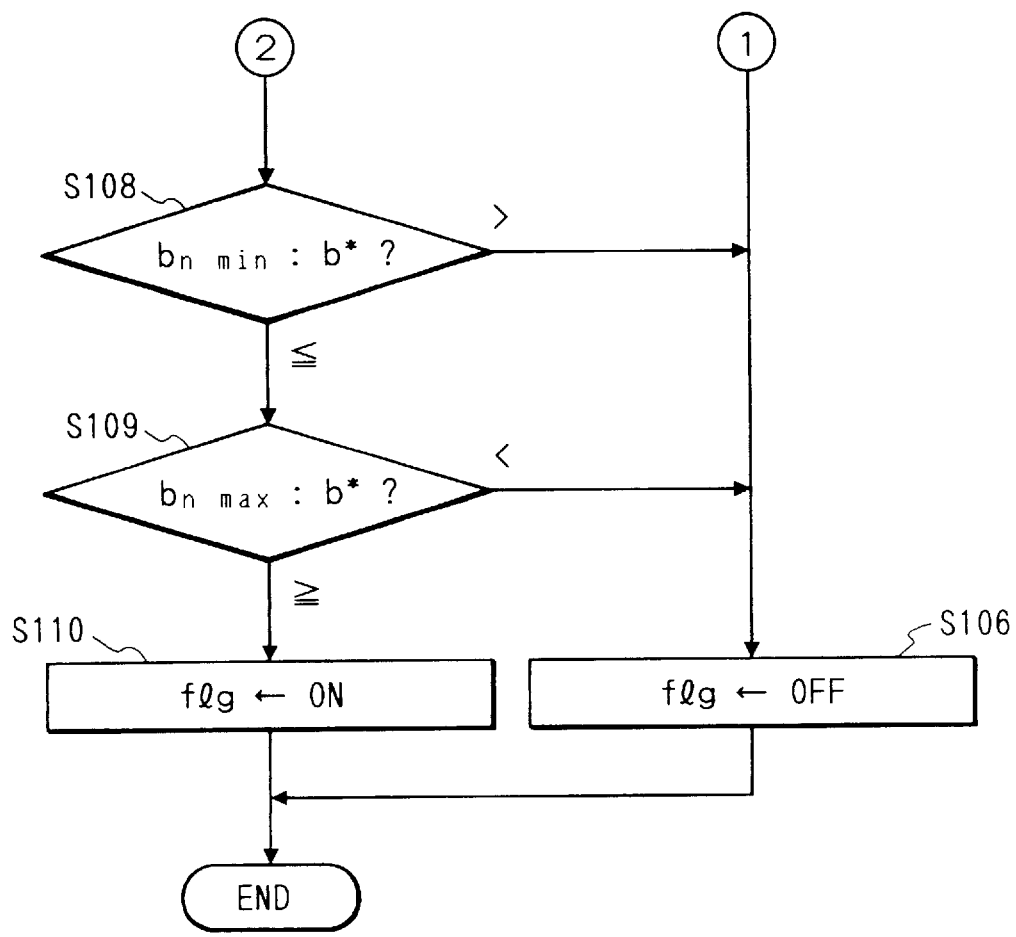
FIG. 25 is a flowchart of the processing for making the color gamut check based on the color gamut information table of FIG. 23.

FIGS. 24 and 25 show the flowcharts of the processing for making the color gamut check based on the color gamut information table of FIG. 23 in the color gamut check unit 28.

At step S100, the pointer is set to the head of the color gamut information table of FIG. 22, and the routine proceeds to step S101.

At step S101, l is set to constant n, and the value of $L^*_{min}$ is set to $L_l$, and the routine proceeds to step S102.

At step S102, the read value of L* and $L_l$ are compared.

If they are not equal, the routine proceeds to step S103, where the value of $L_n + \Delta L$ is set to $L_{n+l}$, and proceeds to step S104.

At step S104, n and the pointer are each incremented by one, and the routine returns to step S102.

If they are equal at step S102, the routine proceeds to step S105, where read a* and $a_{nmin}$ are compared.

If a* is smaller than $a_{nmin}$, the routine proceeds to step S106, where flg is turned off, and the processing is ended.

Otherwise, the routine proceeds to step S107, where read a* and $a_{nmax}$ are compared.

If a* is greater than $a_{nmax}$, the routine proceeds to step S106, where flg is turned off, and the processing is ended.

Otherwise, the routine proceeds to step S108, where read b* and $b_{nmin}$ are compared.

If b* is smaller than $b_{nmin}$, the routine proceeds to step S106, where flg is turned off, and the processing is ended.

Otherwise, the routine proceeds to step S109, where read b* and $b_{nmax}$ are compared.

If b* is greater than $b_{nmax}$, the routine proceeds to step S106, where flg is turned off, and the processing is ended.

Otherwise, the routine proceeds to step S110, where flg is turned on and the processing is ended.

In this way, the color gamut check can be performed simply based on the color gamut information table of FIG. 23, with the slightly lower check accuracy but the shorter processing time.

[Example of processing having higher check accuracy but longer processing time]

Figures 26, 27:
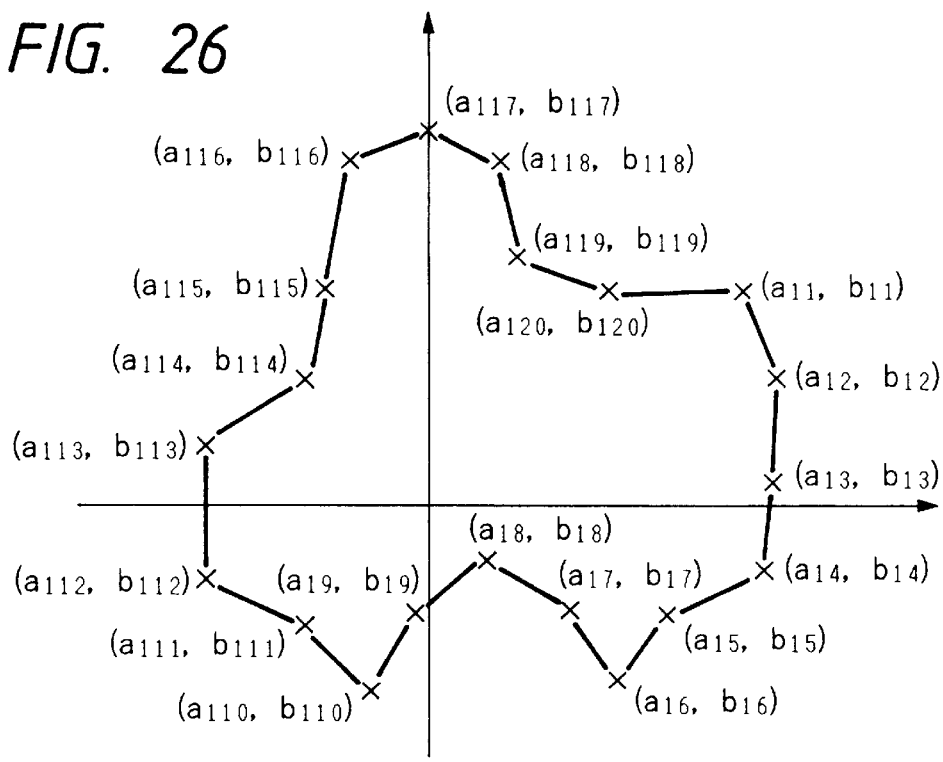
FIG. 26 is a view showing an instance of defining the monitor or printer gamut by an area encircled by a sequence of coordinate points in a two-dimensional plane of a* and b* constituted of rectangular lattices obtained by slicing the three-dimensional color solid in a direction perpendicular to L*.
FIG. 27 shows a table of color gamut information wherein the color gamut of monitor or printer is defined by the area encircled by the sequence of coordinate points.

This exemplary method is a method of defining the color gamut of monitor or printer with an area surrounded by a sequence of coordinate points as shown in FIG. 26 and making the color gamut check based on its information.

In FIG. 26, the color gamut at $L^*_{min}$ is exemplified, and represented by a sequence of twenty coordinate points herein.

Since the gamut may be different with the value of L*, the color gamut information table is as shown in FIG. 27.

The range of L* is from $L^*_{min}$ to $L^*_{max}$, and for each L*, the values of coordinates for the above sequence of coordinate points are stored.

Herein, the number of Ls in a range from $L^*_{min}$ to $L^*_{max}$ is m (constant).

The constants i1, i2, . . . , in correspond to the number of coordinates for each L*.

This table is stored in the data for check in FIG. 11 or the storage unit of data for check in FIG. 17.

Figure 28:
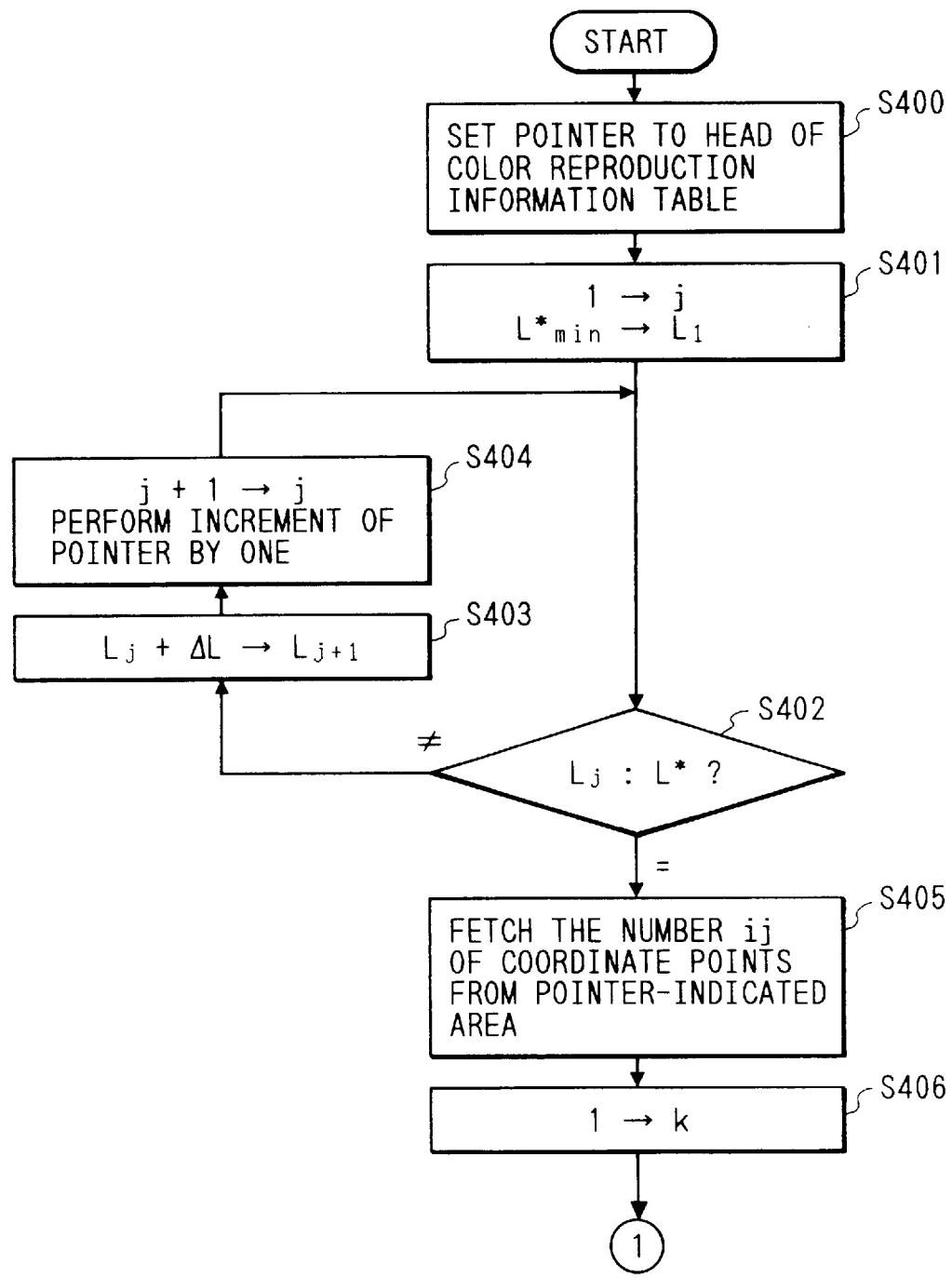
FIG. 28 is a flowchart of a processing for making a color gamut check based on the color gamut information table of FIG. 27.
Figure 29:
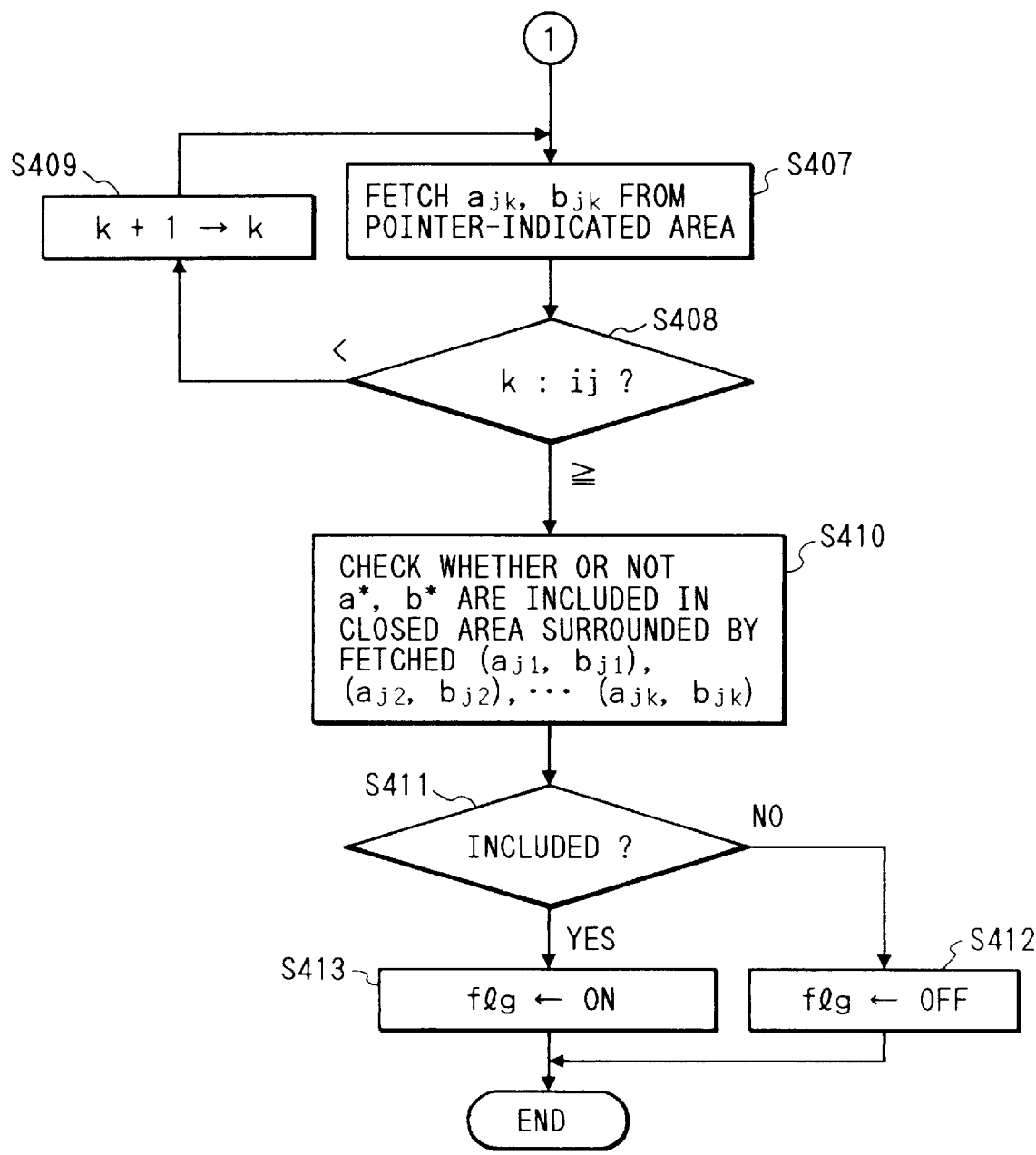
FIG. 29 shows a table of color gamut information wherein the color gamut of monitor or printer is defined by the area encircled by the sequence of coordinate points.
Figure 30:
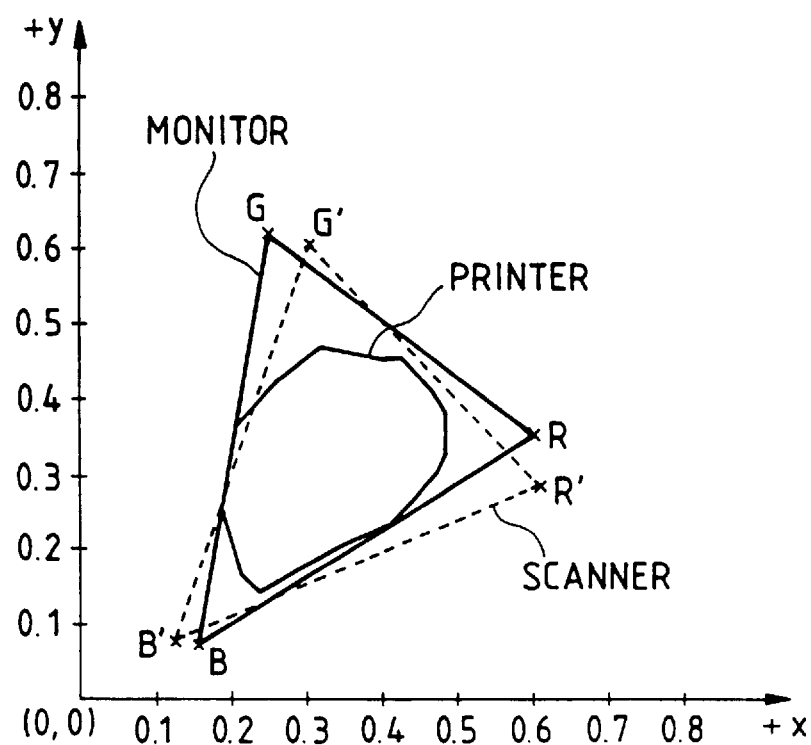
FIG. 30 is a view illustrating the difference in color gamut between devices.
Figure 31:
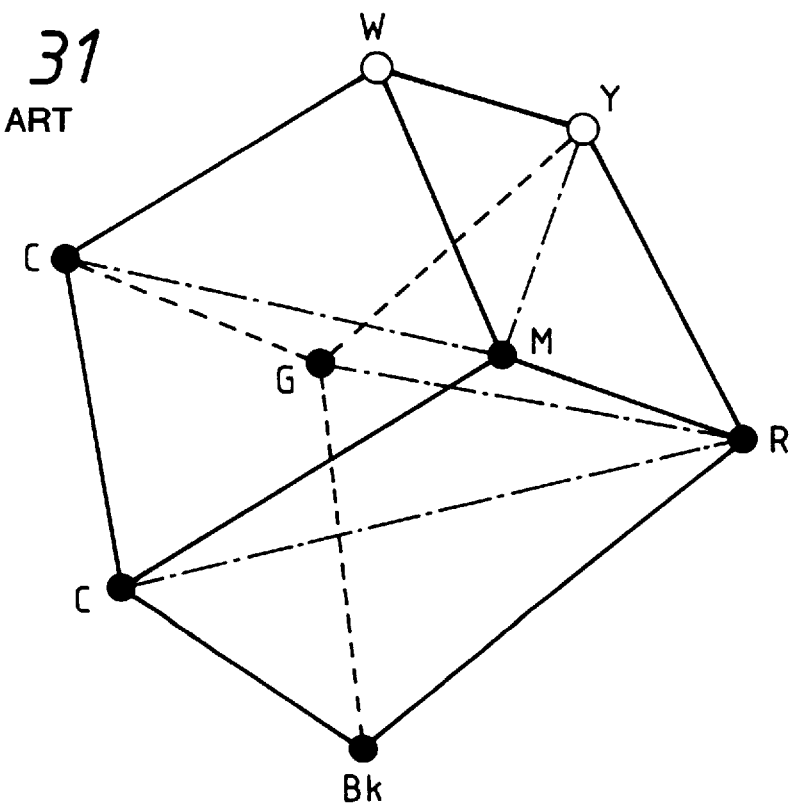
FIG. 31 is a view showing an example of a device color gamut check method.

FIGS. 28 and 29 show the flowcharts of the processing for making the color gamut check based on the color gamut information table of FIG. 27 in the color gamut check unit 28.

At step S400, the pointer is set to the head of color gamut information table of FIG. 27, and the routine proceeds to step S401.

At step S401, l is set to constant j, and the value of $L^*_{min}$ is set at $L_j$, and the routine proceeds to step S402.

At step S402, the read value of L* and $L_j$ are compared.

If they are not equal, the routine proceeds to step S403, where the value of $L_j+\Delta L$ is set to $L_{j+l}$, and proceeds to step S404.

At step S404, j and the pointer are each incremented by one, and the routine returns to step S402.

If they are equal at step S402, the routine proceeds to step S405, where the number ij of coordinate points is fetched from the pointer indicated area, and the routine proceeds to step S406.

At step S406, l is set to constant k, and the routine proceeds to step S407.

At step S407, $a_{jk}$, $b_{jk}$ are fetched from the pointer indicated area, and the routine proceeds to step S408.

At step S408, k and ij are compared.

If ij is greater than k, the routine proceeds to step S409, where k is incremented by one, and the routine proceeds to step S407.

If ij is equal to k, the routine proceeds to step S410 to check whether or not the target data a*, b* is included in a closed area surrounded by fetched $(a_{j1}, b_{j1})$, $(a_{j2}, b_{j2})$, . . . , $(a_{jk}, b_{jk})$.

If the target data is judged to be excluded out of the closed area at step S411, the routine proceeds to step S412, where flg is turned off, and the processing is ended.

On the other hand, if the target data is judged to be included in the closed area, the routine proceeds to step S413, where flg is turned on, and the processing is ended.

In this way, the color gamut check with high accuracy can be performed based on the color gamut information table of FIG. 27.

While the target colors subjected to the color gamut check are R, G, B luminance data, it should be noted that the present invention is also applicable to the image data represented by the other color space such as, for example, Y, I, Q data.

Also, while the judgement method for the color reproduction method is designated from the operation unit in this example, it should be noted that the present invention may be also effective if it is designated by an instruction from, for example, the other application software.

Also, while the color gamut check result is displayed in this example, it should be noted that the present invention may be effective if the image processing such as color space compression processing may be performed based on the result of color gamut check.

Next, an example of the user interface for the application software for the user to designate the information of color gamut check method and device model of color gamut check target described at steps S200 and S201 in FIG. 12 in example 1 and at steps S300 and S301 in FIG. 18 in example 2 is shown in FIG. 33.

Herein, the items for the color gamut check are selected from a menu of the application software, wherein a dialog for color gamut check appears on the screen of the color monitor 1.

The designated color within the dialog is effected by designating the designated color with R, G, B luminance data (R, G, B: 0 to 255) when designating the color of color gamut target.

R, G, B luminance data is color image data created by the application software on the color monitor 1, and L*, a*, b* data indicate the colorimetric values ($0.00 \leq L^* \leq 100.00$, $-500.00 \leq a^* \leq 500.00$, $-200.00 \leq b^* \leq 200.00$) when R, G, B, luminance data is practically displayed on the color monitor 1.

Before check within the dialog is provided to display the designated color within the rectangular area.

After check within the dialog is provided to reflect the result at steps S13 to S16 in FIG. 4.

The color gamut check method within the dialog is effected by provision of designating means for designating the information of color gamut check method at step S200 in FIG. 12 or at step S300 in FIG. 18 in a pull-down menu, wherein there are provided two options of "high speed" with lower check accuracy but shorter processing time and "high accuracy" with higher check accuracy but longer processing time.

The target printer within the dialog is effected by provision of designating means for designating the information of device model of color gamut check target at step S201 in FIG. 12 or at step S301 in FIG. 18 in a pull-down menu, wherein one of a total of four types including two types (CLC1, CLC2) as the CLD (Color Laser Copier) model and two types (BJP1, BJP2) as the BJP (Bubble Jet Printer) model can be selected.

Figure 34:
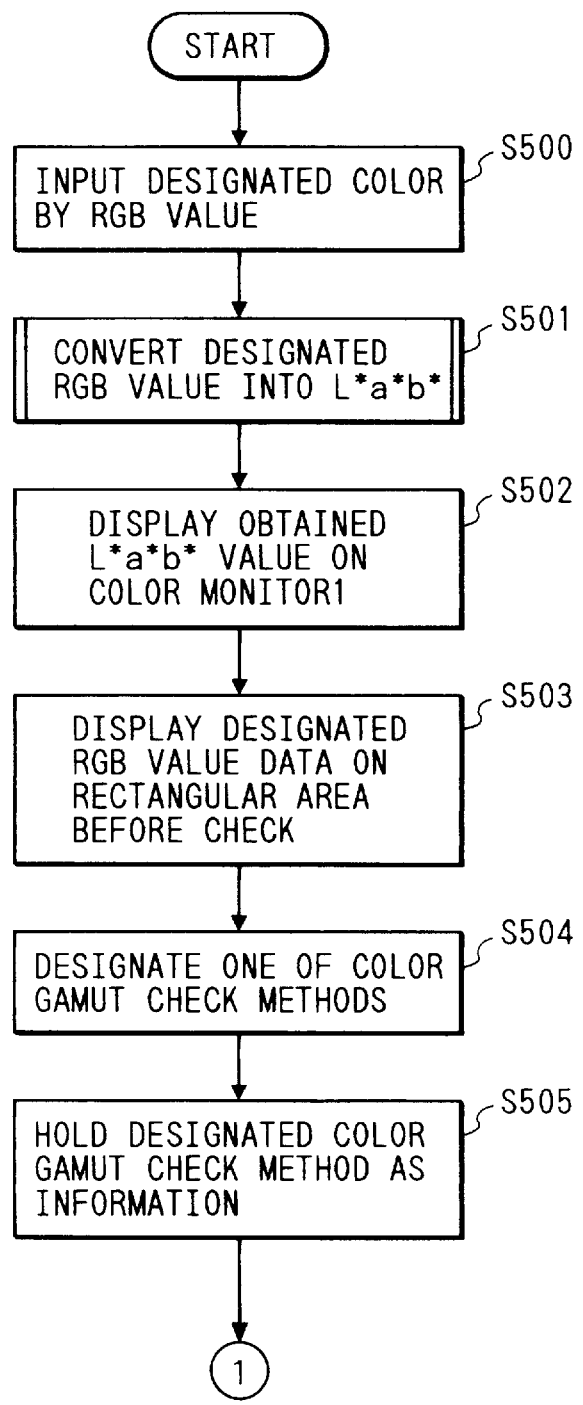
FIG. 34 is a part of a flowchart of a processing for making a color gamut check using the user interface of FIG. 33.

FIGS. 34 and 35 show the flowcharts of the processing for making the color gamut check using the user interface for the application software of FIG. 33.

At step S500, the designated color of color gamut target is numerically input in RGB into the designated color within the dialog, and the routine proceeds to step S501.

At step S501, the RGB values designated at step S500 are converted into the values of L*, a*, b*, and the routine proceeds to step S502.

The conversion process at step S501 is accomplished by reflecting the gamma characteristic of color monitor 1 to RGB data of designated color, and performing the identical processing to that at steps S11 and S12 in FIG. 4.

At step S502, the values of L*, a*, b* obtained at step S501 are displayed at their predetermined locations of the dialog, and the routine proceeds to step S503.

At step S503, the color based on the RGB values designated at step S500 is represented in the rectangular area of before check of the dialog, and the routine proceeds to step S504.

At step S504, one of the color gamut check methods is designated from the pull-down menu for color gamut check method of dialog, and the routine proceeds to step S505.

At step S505, the color gamut check method designated at step S504 is held as the information, and the routine proceeds to step S506.

At step S506, one of the target printers is designated from the pull-down menu for target printer of dialog, and the routine proceeds to step S507.

At step S507, the information of target printer designated at step S506 is held as the information of device model of color gamut check target, and the routine proceeds to step S508.

At step S508, a color gamut check processing identical to that at step S13 in FIG. 4 is performed, and the routine proceeds to step S509.

At step S509, a check is performed to determine whether or not flg is on, as a result of step S508.

If flg is on, the routine proceeds to step S510, where rectangular data based on RGB values designated at step S500 is displayed in the rectangular area of after check of dialog, and the processing is ended.

If flg is off, the routine proceeds to step S511, where white is displayed on the rectangular area of after check of the dialog, and the processing is ended.

In this way, the color gamut check method can be selected in accordance with the uses and function by providing the color gamut check method and the user interface designating the information of device model of color gamut check target.

While in the user interface as above described, a check is made to see whether the designated color is inside or outside the color gamut, and the user is informed of the check result, it should be noted that the present invention is not limited to such interface, but the input image may be subjected to check, and the user may be informed of which portion of the target image is outside the color gamut by making pixels outside the color gamut white.

As above described, with the present invention, the image processing can be performed by selecting the function for making the device color gamut check in the color management system, whereby the color gamut check processing such as a processing with lower check accuracy but shorter processing time and a processing with higher check accuracy but longer processing time, can be selected is accordance with the uses and function.

Since the user is informed and aware of the portion outside the color gamut and can refer to it for the subsequent image processing, the image as desired by the user can be output by the output device.

Various variations of the present invention may be made within the scope as defined in the annexed claims.

What is claimed is:

1. An image processing apparatus comprising:

designating means for designating a type of color gamut check algorithm and an output device model for a color gamut check;

setting means for setting information indicating a color gamut of the output device model in accordance with a designated type of color gamut check algorithm and a designated output device model; and checking means for checking, on the basis of the information, whether input color image data is within the color gamut of the designated output device model.

2. An image processing apparatus according to claim 1, further comprising storage means for storing plural device profiles corresponding to plural output device models.

3. An image processing apparatus according to claim 1, further comprising outputting means for visually outputting a checking result from the checking means to a user.

4. An image processing apparatus according to claim 3, wherein said outputting means comprises a monitor.

5. An image processing apparatus according to claim 1, wherein said designating means designates one of a plurality of types of color gamut check algorithms.

6. An image processing apparatus according to claim 5, wherein said plurality of types of color gamut check algorithms have different processing speeds.

7. An image processing apparatus according to claim 5, wherein said plurality of types of color gamut check algorithms have different accuracies.

8. An image processing apparatus according to claim 1, wherein said checking means checks to determine whether input image data is within the color gamut of the designated output device model based on said information set by said setting means.

9. An image processing apparatus according to claim 2, wherein said storage means stores the plural device profiles to correspond to respective ones of plural types of color gamut check algorithms.

10. An image processing apparatus according to claim 2, wherein the plural device profiles include information on the plural color gamut check algorithms corresponding to respective output device models, and wherein the information indicates a color gamut.

11. A color image processing method for checking whether input color image data is within a color gamut of an output device, said method comprising the steps of:

storing information representing the color gamut of the output device in correspondence with plural color gamut check algorithms;

designating an arbitrary color gamut check algorithm from among the plural color gamut check algorithms;

setting information corresponding to the arbitrary color gamut check algorithm designated in said designating step; and checking whether the input color image data is within the color gamut based on the information set in said setting step.

12. A method according to claim 11, further comprising the step of displaying a result of the checking step to a user.

13. A method according to claim 12, wherein said displaying step displays the result of the checking step visually on a monitor.

14. A method according to claim 11, wherein the plural color gamut check algorithms have different processing speeds.

15. A method according to claim 11, wherein the plural color gamut check algorithms have different accuracies.

* * * * *

UNITED STATES PATENT AND TRADEMARK OFFICE
CERTIFICATE OF CORRECTION

PATENT NO. : 5,815,642

DATED : September 29, 1998

INVENTOR : SHUICHI KUMADA

It is certified that error appears in the above-identified patent and that said Letters Patent is hereby corrected as shown below:

<u>COLUMN 5</u>

Line 47, change "calorimetrically" to --colorimetrically--.

<u>COLUMN 6</u>

Line 16, change "calorimetri-" to --colorimetri- --.

Signed and Sealed this

Eleventh Day of May, 1999

Attest:

Q. TODD DICKINSON

Attesting Officer     Acting Commissioner of Patents and Trademarks